United States Patent
Craig et al.

(10) Patent No.: US 8,483,233 B2
(45) Date of Patent: Jul. 9, 2013

(54) METHODS, SYSTEMS, AND COMPUTER READABLE MEDIA FOR PROVIDING LOCAL APPLICATION ROUTING AT A DIAMETER NODE

(75) Inventors: Jeffrey Alan Craig, Durham, NC (US); Mark Edward Kanode, Apex, NC (US); Kedar Kashinath Karmarkar, Pune (IN); Thomas Matthew McCann, Raleigh, NC (US); David Michael Sprague, Raleigh, NC (US); Mahesh Tomar, Morrisville, NC (US); Donald E. Wallace, Evergreen, CO (US)

(73) Assignee: Tekelec, Inc., Morrisville, NC (US)

( * ) Notice: Subject to any disclaimer, the term of this patent is extended or adjusted under 35 U.S.C. 154(b) by 101 days.

(21) Appl. No.: 13/026,098

(22) Filed: Feb. 11, 2011

(65) Prior Publication Data

US 2011/0200054 A1 Aug. 18, 2011

Related U.S. Application Data

(60) Provisional application No. 61/304,310, filed on Feb. 12, 2010.

(51) Int. Cl.
*H04L 12/56* (2006.01)

(52) U.S. Cl.
USPC ........... 370/401; 370/254; 370/248; 370/384; 370/392; 709/240

(58) Field of Classification Search
USPC .......................... 370/252, 384, 392, 401, 474
See application file for complete search history.

(56) References Cited

U.S. PATENT DOCUMENTS

| 5,228,083 | A | * | 7/1993 | Lozowick et al. ............ 713/160 |
| 5,719,861 | A | | 2/1998 | Okanoue |
| 6,157,621 | A | | 12/2000 | Brown et al. |
| 6,273,622 | B1 | | 8/2001 | Ben-David |
| 6,304,273 | B1 | | 10/2001 | Bonnet |

(Continued)

FOREIGN PATENT DOCUMENTS

| CA | 2 716 544 A1 | 12/2010 |
| EP | 1 134 939 A1 | 9/2001 |

(Continued)

OTHER PUBLICATIONS

Advisory Action for U.S. Appl. No. 12/906,816 (Jun. 5, 2012).

(Continued)

*Primary Examiner* — Andrew Chriss
*Assistant Examiner* — Mohamed Kamara
(74) *Attorney, Agent, or Firm* — Jenkins, Wilson, Taylor & Hunt, P.A.

(57) ABSTRACT

Methods, systems, and computer readable media for providing local application routing at a Diameter node are disclosed. One method includes receiving, at an ingress Diameter message processor associated with a Diameter signaling router (DSR), a Diameter message from a peer Diameter element. At the ingress Diameter message processor, application routing data is accessed to determine whether processing of the Diameter message by a Diameter application is required. In response to determining that Diameter application processing is required, the Diameter message is forwarded to a Diameter message processor hosting a Diameter application identified by the application routing data for processing. In response to determining that Diameter application processing is not required, the Diameter message is forwarded to an egress Diameter message processor associated with the DSR.

21 Claims, 28 Drawing Sheets

U.S. PATENT DOCUMENTS

| | | | |
|---|---|---|---|
| 6,584,073 B1 | 6/2003 | Steele, Jr. et al. | |
| 6,795,546 B2 | 9/2004 | Delaney et al. | |
| 6,865,153 B1 | 3/2005 | Hill et al. | |
| 6,915,345 B1 | 7/2005 | Tummala et al. | |
| 6,918,041 B1 | 7/2005 | Chen | |
| 6,954,790 B2 | 10/2005 | Forslöw | |
| 6,967,956 B1 | 11/2005 | Tinsley et al. | |
| 7,042,877 B2 | 5/2006 | Foster et al. | |
| 7,043,000 B2 | 5/2006 | Delaney et al. | |
| 7,136,635 B1 | 11/2006 | Bharatia et al. | |
| 7,257,636 B2 | 8/2007 | Lee et al. | |
| 7,286,516 B2 | 10/2007 | Delaney et al. | |
| 7,292,592 B2 | 11/2007 | Rune | |
| 7,298,725 B2 | 11/2007 | Rune | |
| 7,333,438 B1 | 2/2008 | Rabie et al. | |
| 7,333,482 B2 | 2/2008 | Johansson et al. | |
| 7,383,298 B2 | 6/2008 | Palmer et al. | |
| 7,403,492 B2 | 7/2008 | Zeng et al. | |
| 7,403,537 B2 | 7/2008 | Allison et al. | |
| 7,466,807 B2 | 12/2008 | McCann et al. | |
| 7,551,926 B2 | 6/2009 | Rune | |
| 7,567,796 B2 | 7/2009 | Tammi et al. | |
| 7,583,963 B2 | 9/2009 | Tammi et al. | |
| 7,590,732 B2 | 9/2009 | Rune | |
| 7,633,872 B2 | 12/2009 | Pitcher et al. | |
| 7,633,969 B2 | 12/2009 | Caugherty et al. | |
| 7,706,343 B2 | 4/2010 | Delaney et al. | |
| 7,792,981 B2 | 9/2010 | Taylor | |
| 7,822,023 B2 | 10/2010 | Lahetkangas et al. | |
| 7,894,353 B2* | 2/2011 | Li et al. | 370/248 |
| 7,898,957 B2 | 3/2011 | Lea et al. | |
| 7,916,685 B2 | 3/2011 | Schaedler et al. | |
| 7,961,685 B2 | 6/2011 | Suh et al. | |
| 7,996,007 B2 | 8/2011 | Bantukul | |
| 7,996,541 B2 | 8/2011 | Marathe et al. | |
| 8,041,021 B2* | 10/2011 | Xu et al. | 379/221.08 |
| 8,045,983 B2 | 10/2011 | Bantukul | |
| 8,170,035 B2 | 5/2012 | Furey et al. | |
| 8,170,055 B2 | 5/2012 | Fang et al. | |
| 2001/0024443 A1 | 9/2001 | Alriksson et al. | |
| 2002/0049901 A1 | 4/2002 | Carvey | |
| 2002/0051427 A1 | 5/2002 | Carvey | |
| 2002/0087723 A1* | 7/2002 | Williams et al. | 709/240 |
| 2002/0133494 A1 | 9/2002 | Goedken | |
| 2002/0133534 A1 | 9/2002 | Forslow | |
| 2002/0141346 A1 | 10/2002 | Garcia-Luna-Aceves et al. | |
| 2002/0181507 A1* | 12/2002 | Jones | 370/474 |
| 2003/0095536 A1 | 5/2003 | Hu et al. | |
| 2003/0115358 A1 | 6/2003 | Yun | |
| 2004/0037278 A1 | 2/2004 | Wong et al. | |
| 2004/0042485 A1 | 3/2004 | Gettala et al. | |
| 2004/0098612 A1 | 5/2004 | Lee et al. | |
| 2005/0002417 A1 | 1/2005 | Kelly et al. | |
| 2005/0099964 A1 | 5/2005 | Delaney et al. | |
| 2005/0232236 A1 | 10/2005 | Allison et al. | |
| 2005/0232407 A1 | 10/2005 | Craig et al. | |
| 2005/0235065 A1 | 10/2005 | Le et al. | |
| 2005/0246545 A1 | 11/2005 | Reiner | |
| 2006/0045249 A1 | 3/2006 | Li et al. | |
| 2006/0077926 A1 | 4/2006 | Rune | |
| 2006/0101159 A1 | 5/2006 | Yeh et al. | |
| 2006/0104210 A1 | 5/2006 | Nielsen | |
| 2006/0123477 A1 | 6/2006 | Raghavan et al. | |
| 2006/0172730 A1 | 8/2006 | Matsuda | |
| 2006/0177007 A1 | 8/2006 | Vaghar et al. | |
| 2006/0200670 A1 | 9/2006 | Kuffel et al. | |
| 2006/0221972 A1 | 10/2006 | Bhargava et al. | |
| 2006/0253563 A1 | 11/2006 | Yang et al. | |
| 2006/0274744 A1 | 12/2006 | Nagai et al. | |
| 2007/0047539 A1* | 3/2007 | Agarwal et al. | 370/384 |
| 2007/0153995 A1 | 7/2007 | Fang et al. | |
| 2007/0168421 A1 | 7/2007 | Kalyanpur et al. | |
| 2007/0214209 A1 | 9/2007 | Maeda | |
| 2007/0280447 A1 | 12/2007 | Cai et al. | |
| 2007/0297419 A1 | 12/2007 | Asherup et al. | |
| 2008/0025230 A1* | 1/2008 | Patel et al. | 370/252 |
| 2008/0039104 A1 | 2/2008 | Gu et al. | |
| 2008/0144602 A1 | 6/2008 | Casey | |
| 2008/0167035 A1 | 7/2008 | Buckley et al. | |
| 2008/0301162 A1 | 12/2008 | Wall et al. | |
| 2008/0317247 A1 | 12/2008 | Jeong et al. | |
| 2009/0080440 A1 | 3/2009 | Balyan et al. | |
| 2009/0129271 A1 | 5/2009 | Ramankutty et al. | |
| 2009/0138619 A1 | 5/2009 | Schnizlein et al. | |
| 2009/0185494 A1 | 7/2009 | Li et al. | |
| 2009/0232011 A1 | 9/2009 | Li et al. | |
| 2010/0042525 A1 | 2/2010 | Cai et al. | |
| 2010/0135287 A1 | 6/2010 | Hosain et al. | |
| 2010/0265948 A1* | 10/2010 | Patel et al. | 370/392 |
| 2010/0299451 A1 | 11/2010 | Yigang et al. | |
| 2011/0060830 A1 | 3/2011 | Kang et al. | |
| 2011/0116378 A1 | 5/2011 | Ramankutty et al. | |
| 2011/0116382 A1 | 5/2011 | McCann et al. | |
| 2011/0188397 A1 | 8/2011 | McCann et al. | |
| 2011/0199895 A1 | 8/2011 | Kanode et al. | |
| 2011/0199906 A1 | 8/2011 | Kanode et al. | |
| 2011/0200047 A1 | 8/2011 | McCann et al. | |
| 2011/0200053 A1 | 8/2011 | Kanode et al. | |
| 2011/0202604 A1 | 8/2011 | Craig et al. | |
| 2011/0202612 A1 | 8/2011 | Craig et al. | |
| 2011/0202613 A1 | 8/2011 | Craig et al. | |
| 2011/0202614 A1 | 8/2011 | Craig et al. | |
| 2011/0202676 A1 | 8/2011 | Craig et al. | |
| 2011/0202677 A1 | 8/2011 | Craig et al. | |
| 2011/0202684 A1 | 8/2011 | Craig et al. | |
| 2011/0225280 A1 | 9/2011 | Delsesto et al. | |
| 2011/0225306 A1 | 9/2011 | Delsesto et al. | |
| 2011/0302244 A1 | 12/2011 | McCann et al. | |
| 2011/0314178 A1 | 12/2011 | Kanode et al. | |
| 2012/0155389 A1 | 6/2012 | McNamee et al. | |
| 2012/0224524 A1 | 9/2012 | Marsico | |

FOREIGN PATENT DOCUMENTS

| | | | |
|---|---|---|---|
| EP | 1 328 102 A1 | 7/2003 | |
| EP | 1 465 385 A1 | 10/2004 | |
| EP | 1 314 324 B1 | 8/2008 | |
| EP | 1 847 076 B1 | 2/2012 | |
| WO | WO 2008/087633 A2 | 7/2008 | |
| WO | WO 2009/058067 A1 | 5/2009 | |
| WO | WO 2009/070179 | * | 6/2009 |
| WO | WO 2009/070179 A1 | 6/2009 | |
| WO | WO 2009/134265 A1 | 11/2009 | |
| WO | WO 2011/047382 A2 | 4/2011 | |
| WO | WO 2011/100587 A2 | 8/2011 | |
| WO | WO 2011/100594 A2 | 8/2011 | |
| WO | WO 2011/100600 A2 | 8/2011 | |
| WO | WO 2011/100603 A2 | 8/2011 | |
| WO | WO 2011/100606 A2 | 8/2011 | |
| WO | WO 2011/100609 A2 | 8/2011 | |
| WO | WO 2011/100612 A2 | 8/2011 | |
| WO | WO 2011/100615 A2 | 8/2011 | |
| WO | WO 2011/100621 A2 | 8/2011 | |
| WO | WO 2011/100626 A2 | 8/2011 | |
| WO | WO 2011/100629 A2 | 8/2011 | |
| WO | WO 2011/100630 A2 | 8/2011 | |
| WO | WO 2012/119147 A1 | 9/2012 | |

OTHER PUBLICATIONS

Non-Final Official Action for U.S. Appl. No. 13/026,076 (Jun. 4, 2012).

Applicant-Initated Interview Summary for U.S. Appl. No. 12/906,816 (May 17, 2012).

Non-Final Official Action for U.S. Appl. No. 13/026,105 (May 16, 2012).

Final Official Action for U.S. Appl. No. 12/906,816 (Feb. 21, 2012).

Applicant-Initiated Interview Summary for U.S. Appl. No. 12/906,816 (Jan. 27, 2012).

Notification of Transmittal of the International Search Report and the Written Opinion of the International Searching Authority, or the Declaration for International Application No. PCT/US2011/024622 (Oct. 31, 2011).

Notification of Transmittal of the International Search Report and the Written Opinion of the International Searching Authority, or the Declaration for International Application No. PCT/US2011/024617 (Oct. 31, 2011).

Notification of Transmittal of the International Search Report and the Written Opinion of the International Searching Authority, or the Declaration for International Application No. PCT/US2011/024614 (Oct. 31, 2011).
Notification of Transmittal of the International Search Report and the Written Opinion of the International Searching Authority, or the Declaration for International Application No. PCT/US2011/024646 (Oct. 28, 2011).
Notification of Transmittal of the International Search Report and the Written Opinion of the International Searching Authority, or the Declaration for International Application No. PCT/US2011/024645 (Oct. 28, 2011).
Notification of Transmittal of the International Search Report and the Written Opinion of the International Searching Authority, or the Declaration for International Application No. PCT/US2011/024642 (Oct. 28, 2011).
Notification of Transmittal of the International Search Report and the Written Opinion of the International Searching Authority, or the Declaration for International Application No. PCT/US2011/024621 (Oct. 28, 2011).
Notification of Transmittal of the International Search Report and the Written Opinion of the International Searching Authority, or the Declaration for International Application No. PCT/US2011/024637 (Oct. 27, 2011).
Notification of Transmittal of the International Search Report and the Written Opinion of the International Searching Authority, or the Declaration for International Application No. PCT/US2011/024629 (Oct. 27, 2011).
Notification of Transmittal of the International Search Report and the Written Opinion of the International Searching Authority, or the Declaration for International Application No. PCT/US2011/024625 (Oct. 25, 2011).
Notification of Transmittal of the International Search Report and the Written Opinion of the International Searching Authority, or the Declaration for International Application No. PCT/US2011/024611 (Oct. 20, 2011).
Notification of Transmittal of the International Search Report and the Written Opinion of the International Searching Authority, or the Declaration for International Application No. PCT/US2011/024601 (Oct. 20, 2011).
Notification of Transmittal of the International Search Report and the Written Opinion of the International Searching Authority, or the Declaration for International Application No. PCT/US2011/024588 (Oct. 20, 2011).
Non-Final Official Action for U.S. Appl. No. 12/906,816 (Oct. 5, 2011).
Jones et al., "Diameter Command Code Registration for the Third Generation Partnership Project (3GPP) Evolved Packet System (EPS)," Network Working Group, RFC 5516, pp. 1-5 (Apr. 2009).
Notification of Transmittal of the International Search Report and the Written Opinion of the International Searching Authority, or the Declaration for International Application No. PCT/US2010/053062 (Jun. 28, 2011).
Znaty, "Diameter, GPRS, (LTE +ePC =EPS), IMS, PCC and SDM," EFORT, pp. 1-460 (May 2010).
"Ericsson Unified Number Portability," (Downloaded from the Internet on Jan. 24, 2011).
"3rd Generation Partnership Project; Technical Specification Group Core Network and Terminals; Policy and Charging Control signalling flows and Quality of Service (QoS) parameter mapping (Release 9)," 3GPP TS 29.213, V9.2.0, pp. 1-129 (Mar. 2010).
"Traffix Diameter Gateway; Instant Diameter Connection to any Network Element," Traffix Systems, pp. 1-4 (Publication Date Unknown) (Downloaded from the Internet on Feb. 8, 2010).
"Traffix Diameter Load Balancer; Scaling the Diameter Control Plane," Traffix Systems, pp. 1-4 (Publication Date Unknown) (Downloaded from the Internet on Feb. 8, 2010).
"Next Generation Networks Load Balancing—The Key to NGN Control, Management, and Growth," Whitepaper by Traffix Systems, pp. 1-7 (Publication Date Unknown) (Downloaded from the Internet on Feb. 8, 2010).

"Universal Mobile Telecommunications Systems (UMTS); LTE; InterWorking Function (IWF) Between MAP Based and Diameter Based Interfaces (3GPP TS 29.305 Version 9.0.0 Release 9)," ETSI TS 129 305 V9.0.0 (Jan. 2010).
"Digital Cellular Telecommunications System (Phase 2+); Universal Mobile Telecommunications System (UMTS); LTE; IP Multimedia (IM) Subsystem Cx and Dx Interfaces; Signalling Flows and Message Contents (3GPP TS 29.228 Version 8.7.0 Release 8)," ETSI TS 129 228 v8.7.0 (Jan. 2010).
"Mapping Diameter Interfaces to Functionality in 3GPP/3GPP2 IMS Architecture," Whitepaper by Traffix Systems, pp. 1-10 (Copyright 2010).
Jones et al., "Diameter Extended NAPTR," Individual Submission Internet-Draft, draft-ietf-dime-extended-naptr-00, pp. 1-9 (Dec. 29, 2009).
Korhonen et al., "Clarifications on the Routing of Diameter Requests Based on the Username and the Realm," RFC 5729, pp. 1-9 (Dec. 2009).
3GPP, "3rd Generation Partnership Project; Technical Specification Group Services and System Aspects; Generic Authentication Architecture (GAA); Generic Bootstrapping Architecture (Release 9)," 3GPP TS 33.220 V9.2.0 (Dec. 2009).
3GPP, "3rd Generation Partnership Project; Technical Specification Group Service and System Aspects; Telecommunication Management; Charging Management; Diameter Charging Applications (Release 9)," 3GPP TS 32.299 V9.2.0 (Dec. 2009).
3GPP, "3rd Generation Partnership Project; Technical Specification Group Service and System Aspects; Telecommunication Management; Charging Management; Online Charging System (OCS): Applications and Interfaces (Release 9)," 3GPP TS 32.296 V9.1.0 (Dec. 2009).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
3GPP, "3rd Generation Partnership Project; Technical Specification Group Core Network and Terminals; Sh Interface Based on the Diameter Protocol; Protocol Details (Release 9)," 3GPP TS 29.329 V9.0.0 (Dec. 2009).
3GPP, "3rd Generation Partnership Project; Technical Specification Group Core Network and Terminals; IP Multimedia (IM) Subsystem Sh Interface; Signalling Flows and Message Contents (Release 9)," 3GPP TS 29.328 V9.0.0 (Dec. 2009).
3GPP, "3rd Generation Partnership Project; Technical Specification Group Core Network and Terminals; 3GPP System to Wireless Local Area Network (WLAN) Interworking; Stage 3 (Release 9)," 3GPP TS 29.234 V9.0.0 (Dec. 2009).
3GPP, "3rd Generation Partnership Project; Technical Specification Group Core Network and Terminals; Cx and Dx Interfaces Based on the Diameter Protocol; Protocol Details (Release 9)," 3GPP TS 29.229 V9.0.0 (Dec. 2009).
3GPP, "3rd Generation Partnership Project; Technical Specification Group Core Network and Terminals; IP Multimedia (IM) Subsystem Cx and Dx Interfaces; Signalling Flows and Message Contents (Release 9)," 3GPP TS 29.228 V9.0.0 (Dec. 2009).
3GPP, "3rd Generation Partnership Project; Technical Specification Group Core Network and Terminals; Policy and Charging Control Over Rx Reference Point (Release 9)," 3GPP TS 29.214 V9.2.0 (Dec. 2009).
3GPP, "3rd Generation Partnership Project; Technical Specification Group Core Network and Terminals; Policy and Charging Control over Gx Reference Point (Release 9)," 3GPP TS 29.212 V9.1.0 (Dec. 2009).
3GPP, "3rd Generation Partnership Project; Technical Specification Group Services and System Aspects; Policy and Charging Control Architecture (Release 9)," 3GPP TS 23.203 V9.3.0 (Dec. 2009).
Jiao et al., "The Diameter Capabilities Update Application," Network Working Group Internet-Draft draft-ietf-dime-capabilities-update-01, pp. 1-8 (Dec. 1, 2009).
Tsou et al., "Realm-Based Redirection in Diameter," Internet Engineering Task Force, draft-ietf-dime-realm-based-redirect-02, pp. 1-7 (Oct. 27, 2009).

Huang et al., "The Diameter Precongestion Notification (PCN) Data Collection Applications," Network Working Group Internet-Draft <draft-huang-dime-pcn-collection-02>, pp. 1-19 (Oct. 26, 2009).
Carlberg et al., "Diameter Priority Attribute Value Pairs," Diameter Maintenance and Extensions (DIME) Internet-Draft <draft-carlberg-dime-priority-avps-00.txt>, pp. 1-6 (Oct. 19, 2009).
Korhonen et al., "Diameter User-Name and Realm Based Request Routing Clarifications," Diameter Maintenance and Extensions (DIME) Internet-Draft, draft-ietf-dime-nai-routing-04.txt, pp. 1-13 (Oct. 6, 2009).
Fajardo et al., "Diameter Base Protocol," DIME Internet-Draft, draft-ietf-dime-rfc3588bis-19.txt, pp. 1-160 (Sep. 2, 2009).
3GPP, "3rd Generation Partnership Project; Technical Specification Group core Network and Terminals; Generic Authentication Architecture (GAA); Zh and Zn Interfaces Based on the Diameter Protocol; Stage 3 (Release 8)," 3GPP TS 29.109 V8.3.0 (Sep. 2009).
3GPP, "3rd Generation Partnership Project; Technical Specification Group Core Network and Terminals; Numbering, Addressing and Identification (Release 8)," 3GPP TS 23.003 V8.6.0 (Sep. 2009).
Jones et al., "Diameter Extended NAPTR," Internet-Draft, draft-jones-dime-extended-naptr-00, pp. 1-8 (Aug. 23, 2009).
Korhonen et al., "Diameter User-Name and Realm Based Request Routing Clarifications," Internet-Draft, draft-ietf-dime-nai-routing-03.txt, pp. 1-11 (Aug. 19, 2009).
Tsou et al., "Session-Specific Explicit Diameter Request Routing," Network Working Group Internet-Draft, draft-tsou-diameter-explicit-routing-03, pp. 1-18 (Aug. 5, 2009).
3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 8)," ETSI TS 129.272 V8.3.0 (Jun. 2009).
Bhardwaj, "Roaming Hubbing & LTE," GSMA London, pp. 1-11 (May 19, 2009).
3GPP, "3rd Generation Partnership Project; Technical Specification Group Core Network and Terminals; Diameter-based Protocols Usage and Recommendations in 3GPP (Release 8)," 3GPP TR 29.909 V8.1.2 (Jan. 2009).
3GPP, "3rd Generation Partnership Porject; Technical Specification Group Service and System Aspects; Telecommunication Management; Charging Management; Charging Data Description for the IP Multimedia Subsystem (IMS) (Release 5)," 3GPP TS 32.225 V5.11.0 (Mar. 2006).
Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).
Aboba et al., "The Network Access Identifier," Network Working Group, RFC 4282, pp. 1-17 (Dec. 2005).
3GPP, "3rd Generation Partnership Project; Technical Specification Group Core Network and Terminals; Policy Control Over Go Interface (Release 6)," 3GPP TS 29.207 V6.5.0 (Sep. 2005).
Eronen et al., "Diameter Extensible Authentication Protocol (EAP) Application," Network Working Group, RFC 4072, pp. 1-31 (Aug. 2005).
Hakala et al., "Diameter Credit-Control Application," Network Working Group RFC 4006, pp. 1-107 (Aug. 2005).
Calhoun et al., "Diameter Mobile IPv4 Application," Network Working Group, RFC 4004, pp. 1-50 (Aug. 2005).
3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).
Calhoun et al., "Diameter Base Protocol," Network Working Group, RFC 3588, pp. 1-148 (Sep. 2003).
Aboba et al., "Authentication, Authorization and Accounting (AAA) Transport Profile," Network Working Group, RFC 3539, pp. 1-39 (Jun. 2003).
Stewart et al., "Stream Control Transmission Protocol," Network Working Group RFC 2960, pp. 1-134 (Oct. 2000).
Greene et al., "Bi-Directional Session Setup Extension to Diameter," Internet Draft <draft-greene-diameter-ss7-session-00.txt>, pbs. 1-12 (Jul. 1998).
"Diameter Overview," referenced from www.ulticom.com/html/products/signalware-diameter-reference-guide.asp (Publication Date Unknown). Date accessed: Feb. 10, 2011.
Notice of Allowance and Fee(s) Due for U.S. Appl. No. 13/026,162 (Dec. 19, 2012).
Final Official Action for U.S. Appl. No. 13/026,076 (Dec. 7, 2012).
Final Official Action for U.S. Appl. No. 13/026,105 (Nov. 26, 2012).
Communication of European Publication Number and Information on the Application of Article 67(3) EPC for European Patent Application No. 11742923.3 (Nov. 21, 2012).
Communication of European Publication Number and Information on the Application of Article 67(3) EPC for European Patent Application No. 11742912.6 (Nov. 21, 2012).
Communication of European Publication Number and Information on the Application of Article 67(3) EPC for European Patent Application No. 11742909.2 (Nov. 21, 2012).
Communication of European Publication Number and Information on the Application of Article 67(3) EPC for European Patent Application No. 11742906.8 (Nov. 21, 2012).
Communication of European Publication Number and Information on the Application of Article 67(3) EPC for European Patent Application No. 11742905.0 (Nov. 21, 2012).
Communication of European Publication Number and Information on the Application of Article 67(3) EPC for European Patent Application No. 11742901.9 (Nov. 21, 2012).
Communication of European Publication Number and Information on the Application of Article 67(3) EPC for European Patent Application No. 11742894.6 (Nov. 21, 2012).
Non-Final Official Action for U.S. Appl. No. 13/026,153 (Nov. 6, 2012).
Non-Final Official Action for U.S. Appl. No. 13/412,352 (Oct. 26, 2012).
Non-Final Official Action for U.S. Appl. No. 13/026,144 (Oct. 16, 2012).
Non-Final Official Action for U.S. Appl. No. 13/026,060 (Sep. 19, 2012).
Communication of European Publication Number and Information on the Application of Article 67(3) EPC for European Patent Application No. 11742921.7 (Sep. 12, 2012).
Non-Final Official Action for U.S. Appl. No. 13/026,081 (Sep. 12, 2012).
Non-Final Official Action for U.S. Appl. No. 13/026,112 (Aug. 29, 2012).
Communication of European publication number and information on the application of Article 67(3) EPC for European Application No. 10824243.9 (Jul. 25, 2012).
Notification of Transmittal of the International Search Report and the Written Opinion of the International Searching Authority, or the Declaration for International Patent Application No. PCT/US2012/027736 (Jun. 12, 2012).
Traffix Systems, "Datasheet; Traffix Signaling Delivery Controller (SDC)," pp. 1-5 (May 2011).
Interview Summary for U.S. Appl. No. 13/026,144 (Mar. 4, 2013).
Supplemental Notice of Allowability for U.S. Appl. No. 13/026,162 (Feb. 27, 2013).
Notice of Allowance and Fee(s) Due for U.S. Appl. No. 13/025,968 (Feb. 27, 2013).
Supplemental Notice of Allowability for U.S. Appl. No. 13/026,162 (Feb. 7, 2013).
Notice of Allowance and Fee(s) Due for U.S. Appl. No. 13/026,031 (Jan. 30, 2013).
Supplemental Notice of Allowability for U.S. Appl. No. 13/026,162 (Jan. 24, 2013).

* cited by examiner

US 8,483,233 B2

METHODS, SYSTEMS, AND COMPUTER READABLE MEDIA FOR PROVIDING LOCAL APPLICATION ROUTING AT A DIAMETER NODE

PRIORITY CLAIM

This application claims the benefit of U.S. Provisional Patent Application Ser. No. 61/304,310 filed Feb. 12, 2010; the disclosure of which is incorporated herein by reference in its entirety.

STATEMENT OF INCORPORATION BY REFERENCE

The disclosures of each of the following commonly-owned, co-pending U.S. patent applications filed on Feb. 11, 2011 are hereby incorporated herein by reference in their entireties:

"Methods, Systems, And Computer Readable Media for Inter-Diameter-Message Processor Routing," (Ser. No. 13/025,968);

"Methods, Systems, And Computer Readable Media For Source Peer Capacity-Based Diameter Load Sharing" (Ser. No. 13/026,031);

"Methods, Systems, And Computer Readable Media For Inter-Message Processor Status Sharing," (Ser. No. 13/026,105);

"Methods, Systems, And Computer Readable Media For Providing Priority Routing At A Diameter Node," (Ser. No. 13/026,060);

"Methods, Systems, And Computer Readable Media For Providing Peer Routing At A Diameter Node," (Ser. No. 13/026,076);

"Methods, Systems, And Computer Readable Media For Providing Origin Routing At A Diameter Node," (Ser. No. 13/026,081);

"Methods, Systems, And Computer Readable Media For Answer-Based Routing Of Diameter Request Messages," (Ser. No. 13/026,112);

"Methods, Systems, And Computer Readable Media For Performing Diameter Answer Message-Based Network Management At A Diameter Signaling Router (DSR)," (Ser. No. 13/026,125);

"Methods, Systems, And Computer Readable Media For Multi-Interface Monitoring And Correlation Of Diameter Signaling Information," (Ser. No. 13/026,133);

"Methods, Systems, And Computer Readable Media For Diameter Protocol Harmonization," (Ser. No. 13/026,144);

"Methods, Systems, And Computer Readable Media For Diameter Network Management," (Ser. No. 13/026,153); and "Methods, Systems, And Computer Readable Media For Diameter Application Loop Prevention," (Ser. No. 13/026,162).

TECHNICAL FIELD

The subject matter described herein relates to performing routing at a Diameter node. More specifically, the subject matter relates to methods, systems, and computer readable media for providing local application routing at a Diameter node.

BACKGROUND

Diameter is an authentication, authorization and accounting (AAA) protocol for computer networks, and is a successor to RADIUS. The Diameter base protocol is defined in IETF RFC 3588, the disclosure of which is incorporated by reference herein in its entirety. A Diameter node is a host process that implements the Diameter protocol and a DSR message processor (MP) is a computer or blade that hosts a DSR signaling application. A Diameter signaling router (DSR) is a set of co-located DSR MPs that share common Diameter routing tables and are supported by a pair of service, operations, administration, and management (SOAM) servers. A DSR may consist of one or more Diameter nodes.

A DSR may include multiple MPs. However, one problem associated with such a configuration is that it is not scalable or user friendly because each MP typically must be configured separately by an operator. When a Diameter message is received at a DSR, the message may need to be processed by one or more Diameter applications. Currently, there is no method for automatically routing Diameter messages to the appropriate Diameter application and, ultimately, to its next hop destination. As such, the operator is burdened with manually configuring inter-MP links, which can be difficult, time consuming, and prone to error. Additionally, each MP is burdened with the full overhead associated with Diameter routing.

Accordingly, in light of these difficulties, a need exists for improved methods, systems, and computer readable media for providing local application routing at a Diameter node.

SUMMARY

Methods, systems, and computer readable media for providing local application routing at a Diameter node are disclosed. According to one method, Diameter messages are routed between multiple Diameter message processors that comprise a Diameter signaling router (DSR). The method includes receiving, at an ingress Diameter message processor associated with the DSR, a Diameter message from a peer Diameter element. Application routing data on the ingress Diameter message processor is accessed to determine whether processing of the Diameter message by a Diameter application is required. In response to determining that Diameter application processing is required, the Diameter message is forwarded to a Diameter message processor hosting a Diameter application identified by the application routing data for processing. Alternatively, in response to determining that Diameter application processing is not required, the Diameter message is forwarded to an egress Diameter message processor associated with the DSR.

A DSR including multiple Diameter message processors for providing local application routing at a Diameter node is also disclosed. The DSR includes an egress Diameter message processor is associated with the logical DSR element. An ingress Diameter message processor associated with the logical DSR element configured to receive a Diameter message from a peer Diameter element and determine whether processing of the Diameter message by a Diameter application is required, wherein determining whether processing of the Diameter message by a Diameter application is required includes accessing application routing data. In response to determining that Diameter application processing is required, the ingress Diameter message processor forwards the Diameter message to a Diameter message processor hosting a Diameter application identified by the application routing data for processing. Alternatively, in response to determining that Diameter application processing is not required, the ingress Diameter message processor forwards the Diameter message to the egress Diameter message processor.

The subject matter described herein may be implemented in software in combination with hardware and/or firmware. For example, the subject matter described herein may be implemented as a function executed by a processor. In one exemplary implementation, the subject matter described herein for providing local application routing at a Diameter node may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for providing local application routing at a Diameter node. Specifically, the subject matter described herein may be implemented at a Diameter signaling router (DSR) network element (NE) including a Diameter connection layer (DCL), Diameter routing layer (DRL), one or more applications, and one or more routing tables. Exemplary DRL capabilities may include: routing request messages to peers or local applications based on message content, discarding or rejecting Diameter request messages based on message content rules, peer congestion control, allowing an operator to access only the features and capacities that are purchased, and easier configuration. Additionally, the subject matter described herein for local application routing at a Diameter node provides a more flexible set of message processing and routing capabilities. Instead of assuming that all routing decisions are based upon a fixed set of messages parameters (Destination-Realm, Destination-Host and Application ID) received in the message, message routing may be based upon user-defined message content rules. According to one aspect, the DSR may support Relay Agent Diameter message routing and a variety of value-add services/applications. In order to support both application processing and core Diameter routing functions, the DSR may support two message routing tables: an application routing table (ART) and a peer routing table (PRT), each of which will be described in greater detail later.

Figure 1:
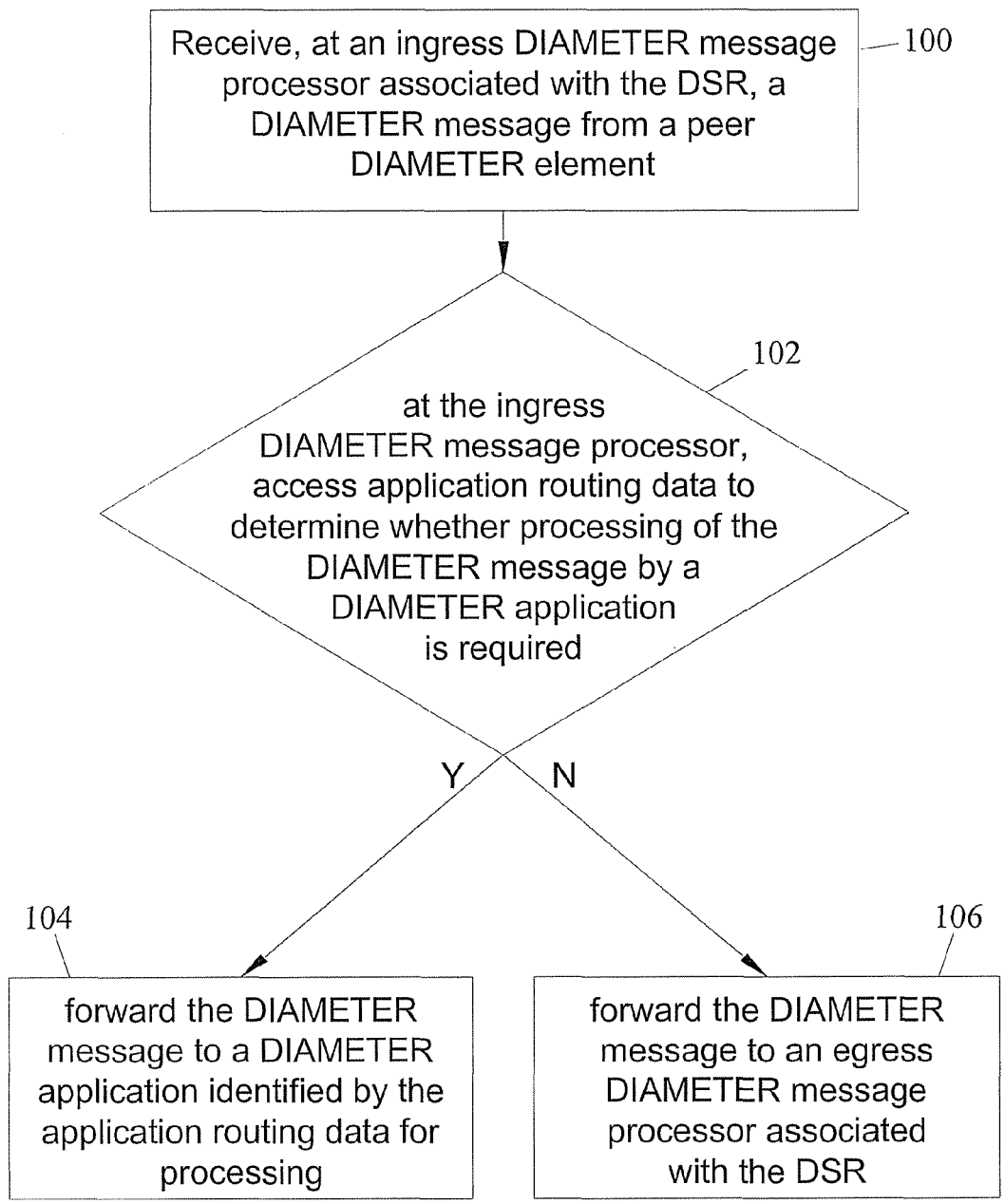
FIG. 1 is a flow chart illustrating a process for providing local application routing at a Diameter node according to an embodiment of the subject matter described herein.

FIG. 1 is a flow chart for providing local application routing at a Diameter node according to an embodiment of the subject matter described herein that includes routing Diameter messages between multiple Diameter message processors (MPs) that together constitute a DSR. Referring to FIG. 1, in step 100, a Diameter message is received, at an ingress Diameter message processor associated with the DSR, from a peer Diameter element. For example, a DSR located in a path between a Diameter client and a Diameter server may receive a Diameter Request message from the client.

In step 102, at the ingress Diameter message processor, an application routing table module (ART) is accessed to determine whether processing of the Diameter message by a Diameter application is required.

In step 104, in response to determining that Diameter application processing is required, the Diameter message is forwarded to a Diameter message processor hosting a local Diameter application identified by the ART for processing.

In step 106, in response to determining that Diameter application processing is not required, the Diameter message is forwarded to an egress Diameter message processor associated with the DSR.

Exemplary Architectures

A first architecture option may include where each MP supports a full Diameter stack that includes the DCL, DRL, and Application layers. A second architecture option may include a DCL that runs on dedicated MPs, Routing and Application layers can either be combined on dedicated MPs or have dedicated MPs for each layer. A third architecture option may include a Diameter stack (DCL, DRL) that runs on dedicated MPs, local Diameter applications run on separate dedicated MPs. Each of these exemplary architecture options will now be described in greater detail below with respect to FIGS. 2, 3, and 4.

Figure 2:
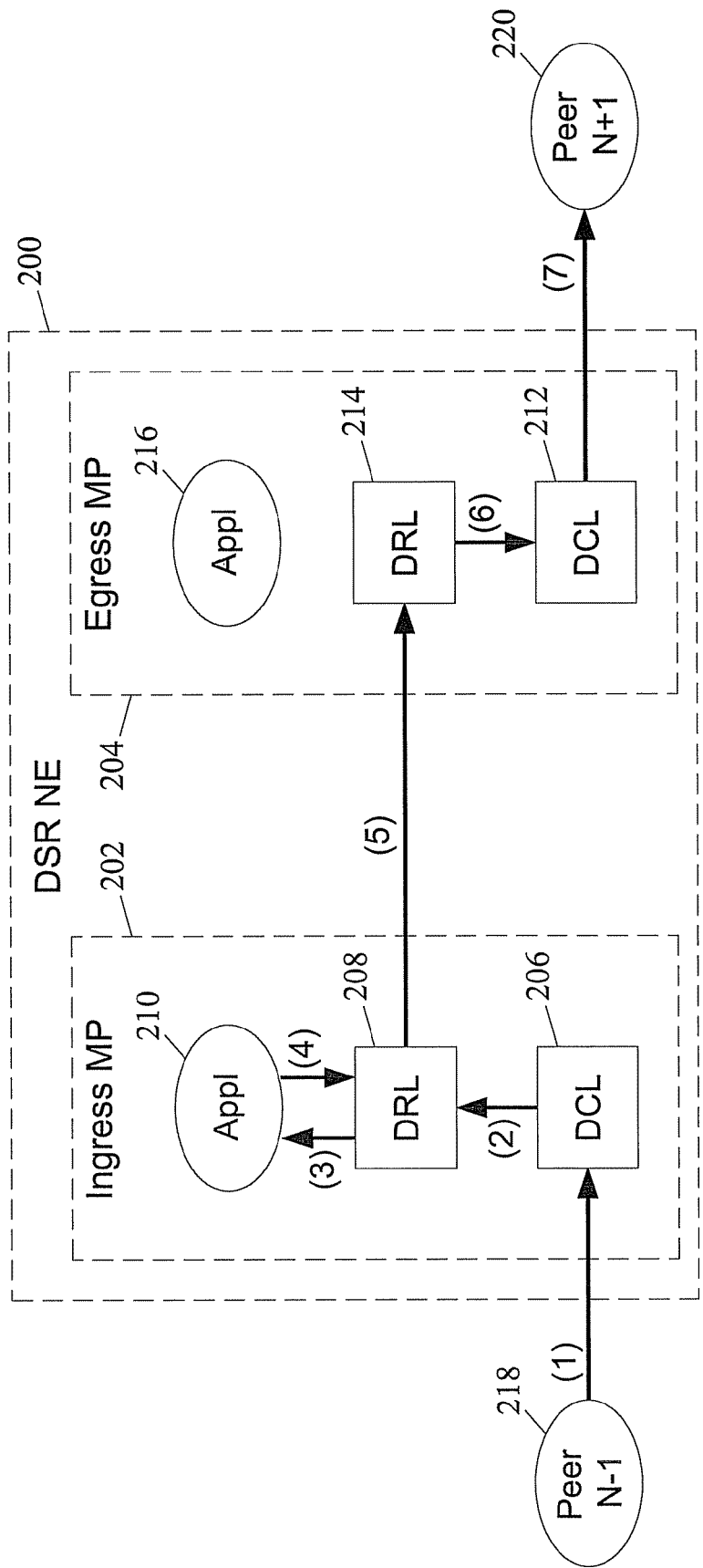
FIG. 2 is a block diagram illustrating an exemplary architecture including a full stack per MP for providing local application routing at a Diameter node according to an embodiment of the subject matter described herein.

FIG. 2 is a block diagram illustrating an exemplary architecture including a full stack per MP for providing local application routing at a Diameter node according to an embodiment of the subject matter described herein. Referring to FIG. 2, DSR network element (NE) 200 may include ingress MP 202 for receiving Diameter messages from peers and egress MP 204 for transmitting Diameter messages to peers. Ingress MP 202 and egress MP 204 may each include a DCL, DRL, and one or more applications. For example, ingress MP 202 may include DCL 206, DRL 208, and application 210. Likewise, egress MP 204 may include DCL 212, DRL 214, and application 216. In order to communicate between ingress MP 202 and egress MP 204, DRL 208 of ingress MP 202 may be operable to communicate with DRL 214 of egress MP 204. Additionally, DRLs 208 and 214 may each be operable to communicate with DCLs 206 and 212 and applications 210 and 216, respectively.

In an exemplary Diameter message routing scenario, peer N−1 218 may send a Diameter message to DSR NE 200. The Diameter message may be received by DCL 206 of ingress MP 202. Ingress messages may be processed completely on ingress MP 202 up through the selection of a destination peer for the Diameter message by DRL 208. Continuing the exemplary scenario above, DCL 206 may pass the Diameter message to DRL 208.

If application processing is required, ingress DRL 208 may forward the Diameter message to a Diameter message processor hosting a local application(s). For example, DRL 208 may forward the Diameter message to an MP hosting local application 210, which processes the message and returns the message to DRL 208. It is appreciated that application distribution function may not be required.

Next, ingress DRL 208 may forward the Diameter message to egress DRL 214 for forwarding to the local DCL queue 212. Egress DCL 212 may then transmit the Diameter message to peer N+1 220.

Figure 3:
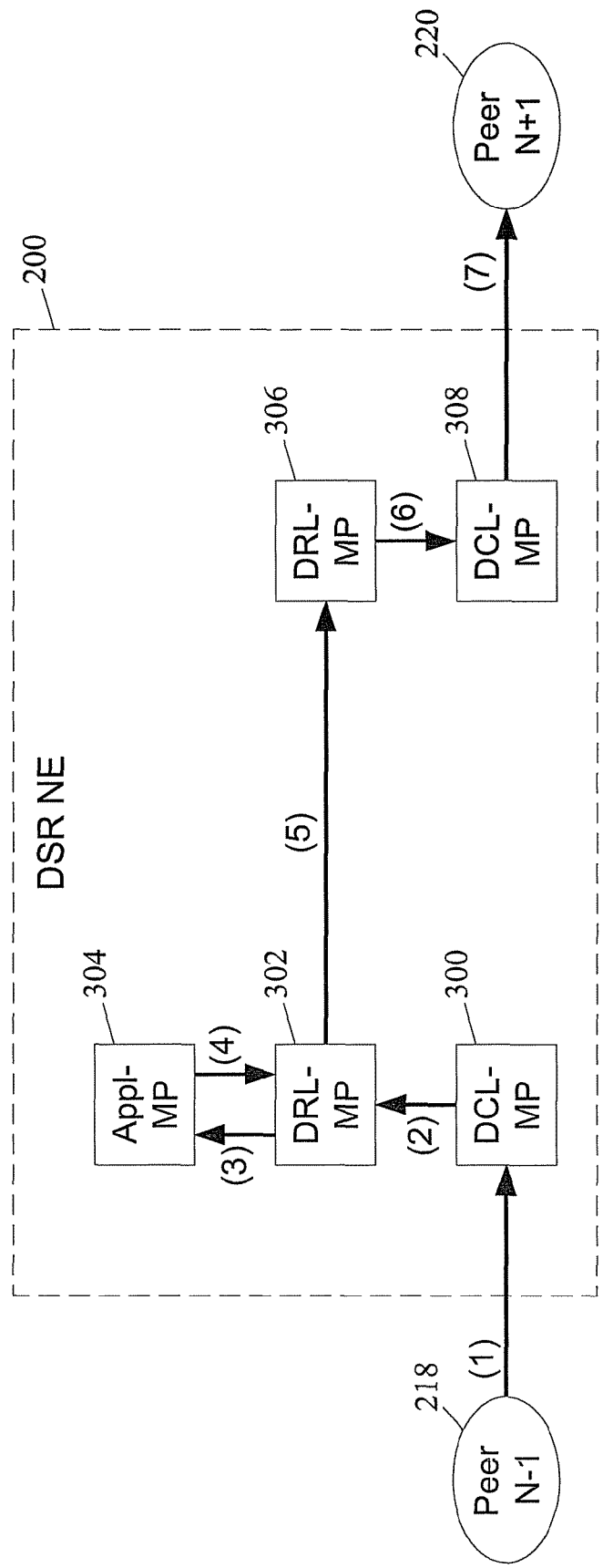
FIG. 3 is a block diagram illustrating an exemplary architecture including dedicated DCL MPs for providing local application routing at a Diameter node according to an embodiment of the subject matter described herein.

FIG. 3 is a block diagram illustrating an exemplary architecture including dedicated DCL MPs for providing local application routing at a Diameter node according to an embodiment of the subject matter described herein. In contrast to the full stack-per MP embodiment shown in FIG. 2, the embodiment shown in FIG. 3 includes dedicated DCL MPs. Referring to FIG. 3, DSR NE 200 may include DCL-MP 300 for receiving Diameter messages from peers and DCL-MP 308 for transmitting Diameter messages to peers.

Similarly, DSR NE 200 may include DRL-MP 302 and DRL-MP 306 for receiving Diameter messages from peers and for transmitting Diameter messages to peers. In contrast to a full stack-per MP embodiment (FIG. 2), application-MP 304 may be associated with DRL-MP 302 and may not have a corollary associated with DRL-MP 306. Like FIG. 2, DRL-MPs 302 and 306 may each be operable to communicate with one another.

Therefore, in an exemplary Diameter message routing scenario analogous to the one described above with respect to FIG. 2, ingress Diameter messages may be received by DCL-MP 300, which may distribute the Diameter message (e.g., Request messages) to DRL-MP 302 based on various factors including, but not limited to, the availability, transactions per second (TPS) capacity and congestion status of DRL-MP 302 as compared with other DRL-MPs (not shown in their entirety).

DRL-MP 302 may determine whether application processing required. If application processing is required, ingress DRL-MP 302 may distribute the Request message to Appl-MP 304 (also based on its availability, TPS capacity and congestion status).

Ingress DRL-MP 302 may then select a destination peer for the message and ingress DRL-MP 302 may forward the message to egress DRL-MP 306. Egress DRL-MP 306 may then forward the message to egress DCL-MP 308 (highest degree on inter-MP communication) for delivery to peer N+1 220 selected by DRL-MP 302.

Figure 4:
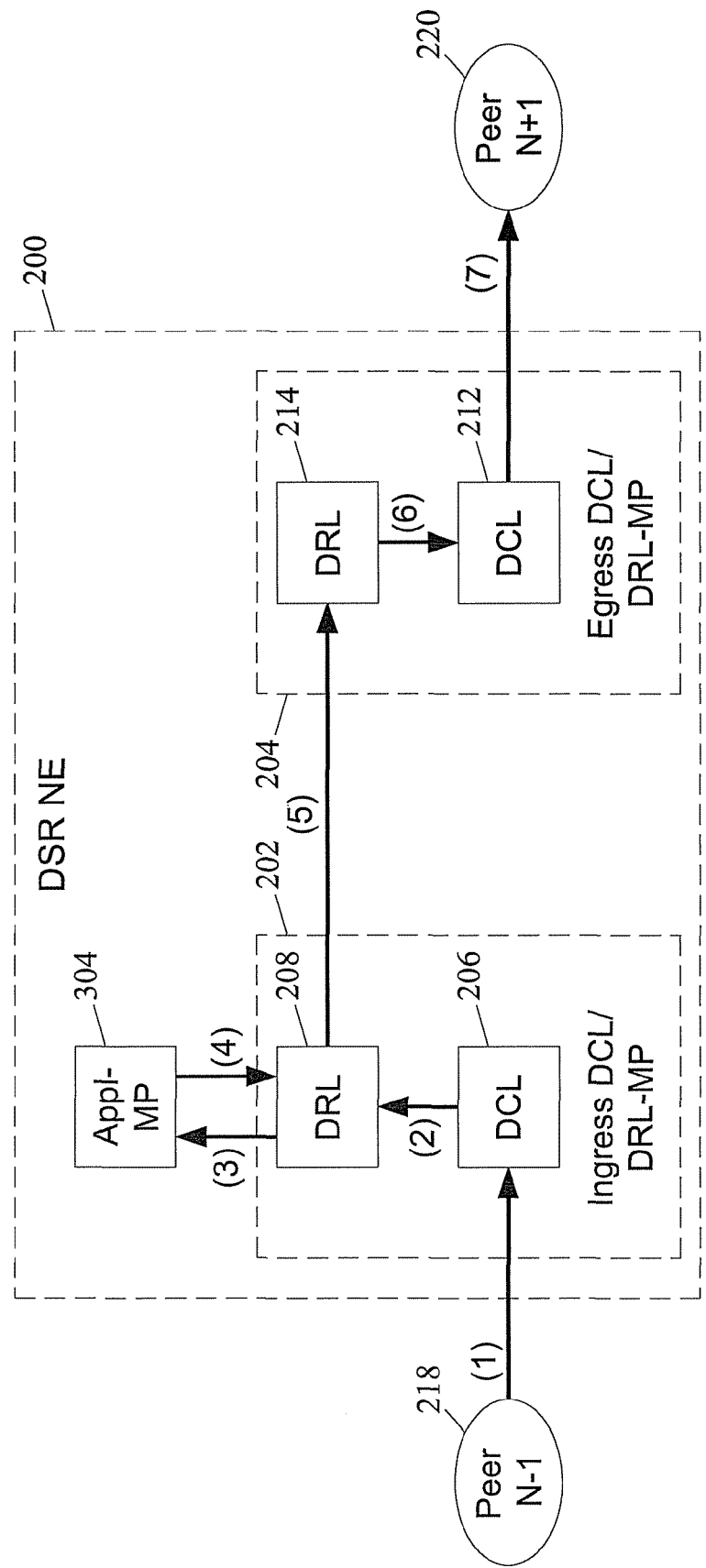
FIG. 4 is a block diagram illustrating an exemplary architecture including dedicated DCL/DRL and application MPs for providing local application routing at a Diameter node according to an embodiment of the subject matter described herein.

FIG. 4 is a diagram illustrating an exemplary architecture including dedicated DCL/DRL and application MPs for providing local application routing at a Diameter node according to an embodiment of the subject matter described herein. It may be appreciated that FIG. 4 represents a hybrid approach between the full stack per MP of FIG. 2 and the dedicated DCL/DRL/application-MPs of FIG. 3. Referring to FIG. 4, in an exemplary Diameter message routing scenario, peer N−1 218 may send a Diameter message to DSR NE 200. The Diameter message may be received by DCL 206 of ingress MP 202. Ingress messages may be processed completely on ingress MP 202 up through the selection of a destination peer for the Diameter message by DRL 208. DCL 206 may then pass the Diameter message to DRL 208.

If application processing is required, ingress DRL 208 may forward the Diameter message to local application(s). For example, DRL 208 may forward the Diameter message to local application 304, which may process the message and return the message to DRL 208.

Next, ingress DRL 208 may forward the Diameter message to egress DRL 214 for forwarding to the local DCL queue 212. Egress DCL 212 may then transmit the Diameter message to peer N+1 220.

Figure 5:
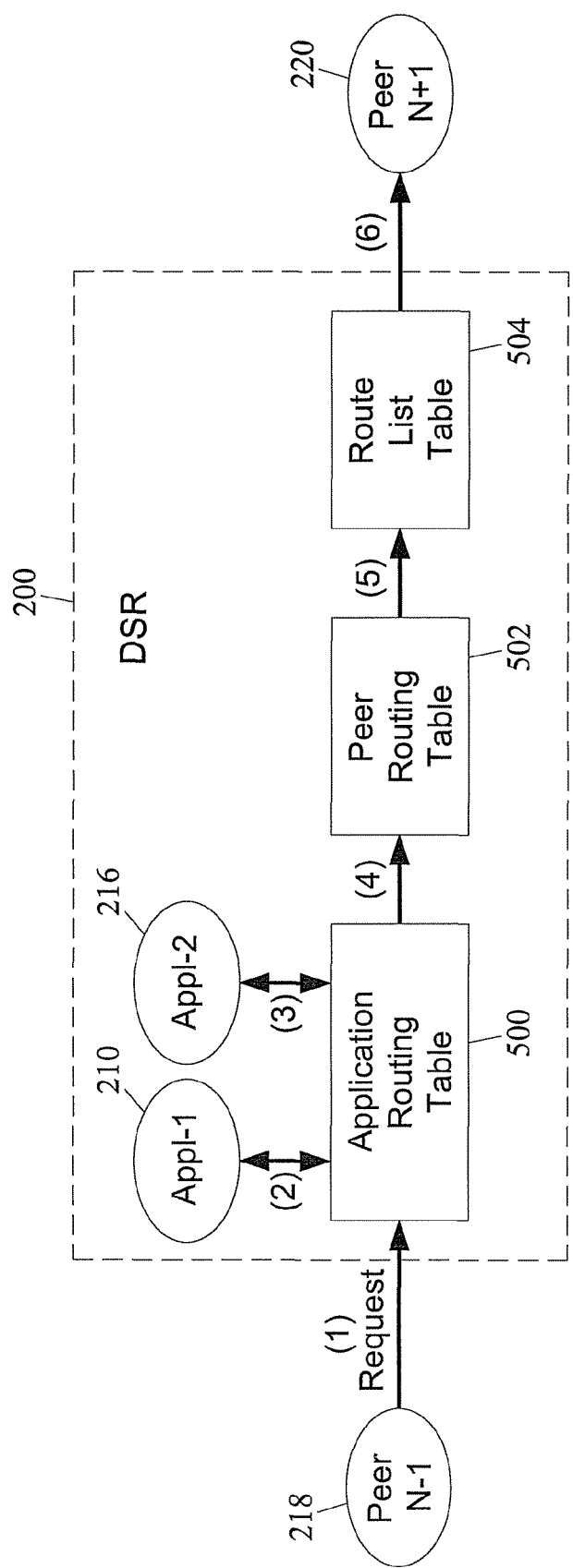
FIG. 5 is a block diagram illustrating an exemplary high level message routing flow for providing local application routing at a Diameter node according to an embodiment of the subject matter described herein.

FIG. 5 is a block diagram illustrating an exemplary high level message routing flow for providing local application routing at a Diameter node according to an embodiment of the subject matter described herein. Referring to FIG. 5, peer N−1 218 may send a Diameter request message to DSR 200. DSR 200 may consult ART 500 in order to determine whether processing of the message by a Diameter application is required. ART 500 may be searched when an ingress message is received from a peer. If the message content matches an ART rule, the message is forwarded to the application for processing. This continues iteratively until no additional rule matches are found. For example, ART 500 may forward the message to application-1 210 for processing and, after the message is returned to ART 500, the message may then be forwarded to application-2 216 for processing.

After local application processing is completed, ART 500 may forward the message to PRT 502. Peer Routing Table (PRT) 502 may be searched after ART 500 searching is completed such that if the message content (after application processing updates) matches a PRT 502 rule, the message may be routed to a Diameter peer as defined by a Route List in route list table 504 associated with the rule. Thus, the message may be sent to peer N+1 220 after consulting route list table 504.

Figure 6:
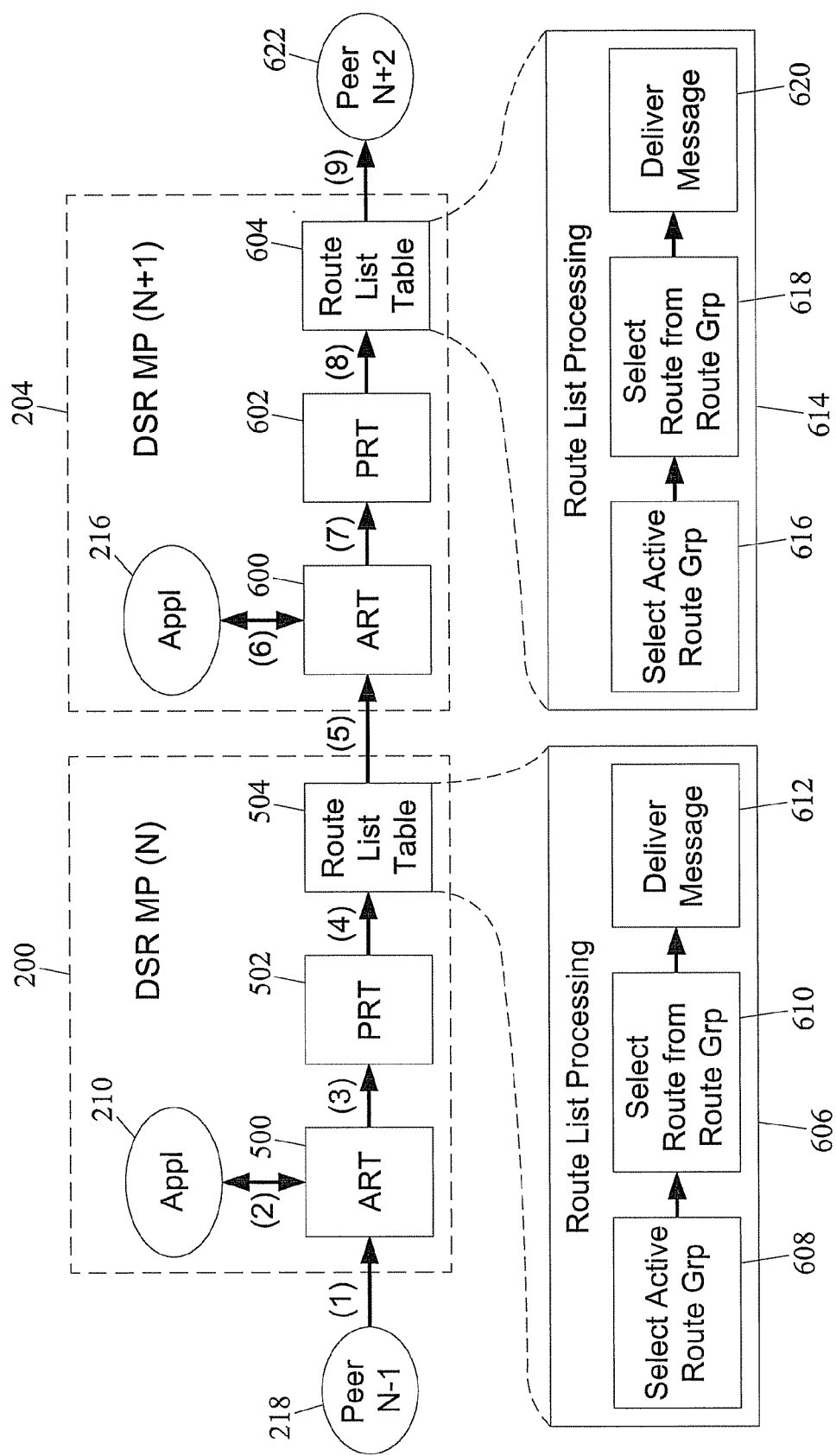
FIG. 6 is a block diagram illustrating an exemplary scalable, inter-MP routing DSR NE including a Diameter node per MP for providing local application routing at a Diameter node according to an embodiment of the subject matter described herein.

FIG. 6 is a block diagram illustrating an exemplary scalable, inter-MP routing DSR NE including a Diameter node per MP for providing local application routing at a Diameter node according to an embodiment of the subject matter described herein. A Diameter node per MP design may have several disadvantages from a customer point of view. For example, separate ART, PRT and Route List tables must be configured on each DSR MP. Additionally, the full-mesh backbone between the DSR MPs must be configured and the overhead of DRL routing rules must be applied twice each time a message is routed between two DSR MPs as shown below. As a result, it is desirable to reduce or eliminate these disadvantages.

According to one embodiment, an improvement to "N" independent DSR nodes is to share the DRL tables between DSR MPs, thus treating the DSR NE as a single Diameter "Node" from a routing perspective. In such an embodiment, the ART, PRT, Route List, Route Group, Route and Peer tables may be common to all DSR MPs in the DSR NE. A new "DSR NE" Table may then be created to serve as the source for auto-configuration of full-mesh SCTP connections amongst the MPs which are part of an DSR NE. Additionally, it may be desirable to support multiple DSR NEs at the same site.

With a single DSR NE configuration, redundant DRL routing on both the Ingress and Egress MPs would be eliminated as follows. The Ingress DSR MP which initially receives a message from a peer would be responsible for ART and PRT table searches and Route Selection. The Ingress DSR MP selects a route from the Active Route Group and forwards both the message it received from its peer and the selected route (peer) to the DSR MP which controls the peer connection. When the Egress DSR MP receives a Request message from a peer DSR MP containing a Route, it will bypass ART and PRT processing and attempts to deliver the message to the peer selected by the Ingress MP. DRL processing on the Egress DSR MP should be kept to a bare minimum.

Referring to FIG. 6, ingress MP 200 may become DSR MP (N) 200 and egress MP 204 may become DSR MP (N+1) 204. Peer N−1 218 may send a Diameter message to DSR MP (N) 200, where it may be processed by ART 500. ART 500 may determine whether local application processing is required and, if so, may forward the Diameter message to application 210. After being returned to ART 500, the Diameter message may be forwarded to PRT 502 and then to route list table 504.

Processing performed using route list table 504 may include route list processing 606. Route list processing 606 may include selecting an active group 608, selecting a route from the route group 610, and delivering the message 612.

When the message is received by DSR MP (N+1) 204, it may be processed by ART 600. ART 600 may determine whether local application processing is required and, if so, may forward the Diameter message to application 216. After being returned to ART 600, the Diameter message may be forwarded to PRT 602 and then forwarded to route list table 604.

Processing performed using route list table 604 may include route list processing 614. Route list processing 614 may include selecting an active group 616, selecting a route from the route group 618, and delivering the message 620.

Figure 7:
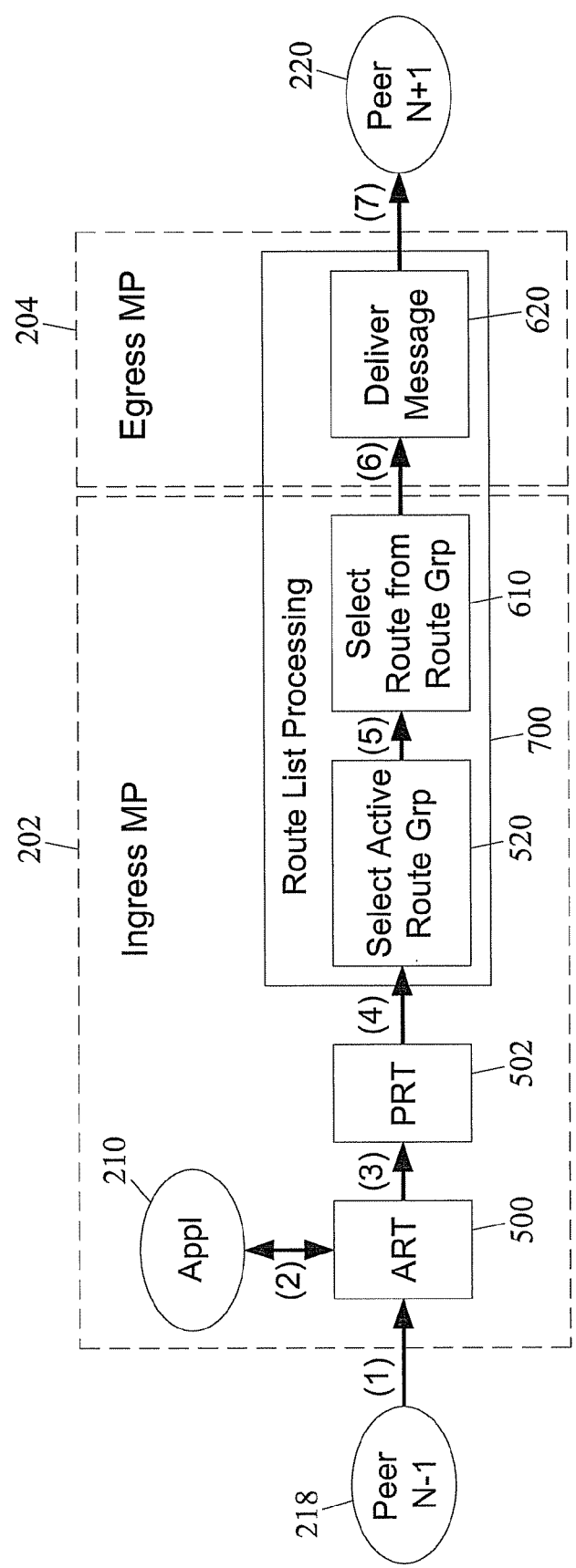
FIG. 7 is a block diagram illustrating an exemplary scalable DSR NE including functional partitioning for providing local application routing at a Diameter node according to an embodiment of the subject matter described herein.

FIG. 7 is a block diagram illustrating an exemplary scalable DSR NE including functional partitioning for providing local application routing at a Diameter node according to an embodiment of the subject matter described herein. Referring to FIG. 7, it may be appreciated that message delivery step 620 of route list processing 700 may be associated with logical egress MP 204, while the remaining functionality may be associated with logical ingress MP 202. Specifically, ART 500, local application 210, PRT 502, and the selection of a route group step 520 and the selection of a route from the route group step 610 of route list processing 700 may be associated with logical ingress MP 202.

DSR Request-Message Processing & Routing

DRL routing rules may consist of a pre-defined set of columns in a table, each column associated with message parameter, that the user can define a criteria for (e.g., "equals value "X", parameter's value or existence is "don't care", etc. If the message matches more than one routing rule, the highest priority routing rule is selected and the "action" assigned to the routing rule by the operator will be invoked. Example "actions" may include routing to local DSR application (ART) or peer (PRT) and sending an answer response message.

Message Parameters

Each routing table may support the following basic Request message parameters: Destination-Realm AVP, Destination-Host AVP, and Application ID (in header). In addition to the Request message parameters described above, the subject matter described herein may also support the following Request message parameters: Origin-Realm AVP, Origin-Host AVP, User-Name AVP, and Command-Code (in header).

Routing Rules

Parameter Values

For each message parameter in a message routing rule, the operator should be able to specify a value (e.g., exact, prefix, postfix), whether the parameter exists or whether it doesn't matter (don't care). The following should be supported. It is appreciated that many message parameters are of type integer or string, including: decimal value (exact match), character string (exact match), character string (prefix match), character string (postfix match), "no AVP instances present", "at least one AVP instance present" (regardless of its value), and "don't care" (ignore its presence and value). If the parameter is located in the Diameter message header, then this represents the actual field value. If the parameter is an AVP, then this represents the "Data" field of the AVP.

Routing Tables

Searching

When DRL receives a Request message, it may extract the set of parameter values needed to search the routing tables. If a routing table search retrieves more than one routing rule, than the rule with the highest priority (i.e., lowest value) may be selected. If the routing table is properly configured, the search should not return two rules with the same priority. It may be difficult to detect duplicate entries during GUI configuration. If the search returns two of more rules with the highest priority, then the first rule will be used.

It may be appreciated that a threshold alarm should be generated each time this problem is encountered to warn the operator that they may have a routing configuration issue.

It may be appreciated that it may be necessary in the future to support precedence rules for resolving rule priority conflicts.

If the search returns no rules, then DRL behavior is routing table specific (see subsequent slides regarding each routing table type).

Table 1 below illustrates an example PRT.

TABLE 1

| Rule# | Destination Realm | Application ID | Destination Host | Route List Name | Action | Priority |
|---|---|---|---|---|---|---|
| 1 | tklc.com | 88 | www.tklc.com | TKLC-Webserver | Route to Peer | 1 |
| 2 | tklc.com | 88 | don't care | TKLC-Realm | Route to Peer | 2 |
| 3 | tklc.com | don't care | don't care | TKLC-Default | Route to Peer | 99 |

In a first exemplary scenario, a message may be received including the following parameters: Destination-Realm=tklc.com, Application-ID=88, and Destination-Host=www.tklc.com. Referring to Table 1, rules 1, 2, and 3 match, but rule 1 would be selected because it has the highest priority.

In a second exemplary scenario, a message may be received including the following parameters: Destination-Realm=tklc.com, Appl-ID=88. Rules 2 and 3 match but rule 2 would be selected because it has the highest priority.

Decorated NAIs

It may be desirable in some embodiments for DSR to support Decorated NAIs in order for some service providers to control their use. Specifically, service providers may want to control Decorated NAI usage on either a system-wide basis or at a finer granularity. Finer granularity control may include controlling NAI usage based on things such as: where the message originated, the realm from which the message was originated (aka Origin-Realm), or the peer from which the message was received.

In one embodiment, Decorated NAI processing may be a Proxy Agent function. In such an embodiment, decorated NAI processing may be handled as a local DSR application. When DSR needs to support Decorated NAI processing, the User-Name AVP (which contains the Decorated NAI) may be added to the ART. The operator then defines one or more ART rules to trigger Decorated NAI processing by a local DSR application.

Host Routing

The Diameter base protocol only uses the Destination-Host parameter for routing to the node's local application or to a directly connected adjacent node (peer). It is appreciated that secondary routes to a directly connected host are not mentioned or recommended in The Diameter base protocol. The DSR solution described herein may provide greater flexibility for host routing. Specifically, the DRL routing tables may support using the Destination-Host parameter for routing decisions regardless of whether the Host is a peer or not a peer.

Using the capabilities of the Route List, multiple routes can be created for routing messages to a Host which is directly connected to a DSR MP. This may be useful, for example, when a network or peer problem exists that prevents a DSR MP from using a direct connection to the peer. When the direct connection fails, DRL may use a secondary route through another DSR Relay Agent in order to route the message.

Figure 8:
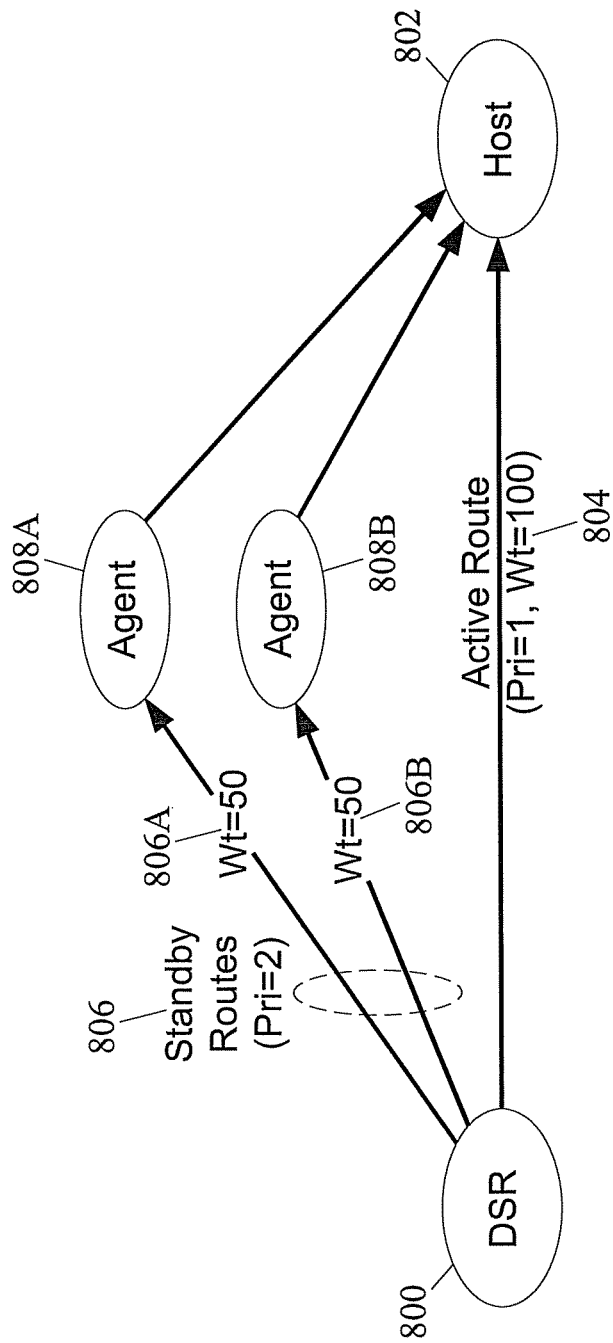
FIG. 8 is a network diagram illustrating an exemplary host routing scenario for providing local application routing at a Diameter node according to an embodiment of the subject matter described herein.

FIG. 8 is a network diagram illustrating an exemplary host routing scenario for providing local application routing at a Diameter node according to an embodiment of the subject matter described herein. In one embodiment, one use of multiple routes to a directed connected host includes a Route List configuration with a single, high-priority route associated with the direct connection to the host and one or more lower priority routes through adjacent Relay Agents. Active routes may be used for routing messages to the Host. Standby routes may be used if the Active routes fail.

Routing to Local DSR Applications

DSR may support a variety of nodes in a Diameter Network such as: client, server, and agents (e.g., relay, proxy, redirect, and translation).

DSR may support one or more of these local nodes simultaneously. DSR may apply one or more services (e.g., via local DSR Applications) to the same message. However, it may be appreciated that DSR may not be required and may prevent invoking the same local application multiple times for the same end-to-end Diameter transaction (i.e., prevent local application message looping).

DSR may provide the ability to control the order of application invocations for message. For example: When message arrives from network meeting certain message content criteria invoke Appl-X. When Appl-X completes processing a new message content criteria is meet then invoke Appl-Y. When Appl-Y completes processing route to message to a peer.

DSR may support the ability of a local application to modify a message but not remain in the signaling path for the remainder of that transaction or session DRL may support the following types of local DSR applications. First, DRL may support an addressable Diameter Node endpoint that either originates or terminates a Diameter session (e.g., Diameter Client, Server, or Translation Agent). DRL may also support a Diameter relay agent that may or may not be an addressable Diameter node which intercepts certain types of messages and sends an Answer response to the peer containing new destination routing information. DRL may support a back-to-back application that is an addressable Diameter node which terminates a Diameter session from one node, initiates a new Session on behalf of the requestor, and interworks the sessions between the two nodes (e.g., AAAH Server). DRL may support an application that is NOT an addressable Diameter node but wants to insert itself in the end-to-end transaction signaling flow (Request/Answer) and may add or modify AVPs in the message (e.g., Diameter Proxy Agent). DRL may support an application that is NOT an addressable Diameter node, wants to intercept certain messages and optionally modify the message that, for example, affects message routing, but does NOT want to remain in the end-to-end signaling flow (e.g., Tekelec DSR value-add service).

Figure 9:
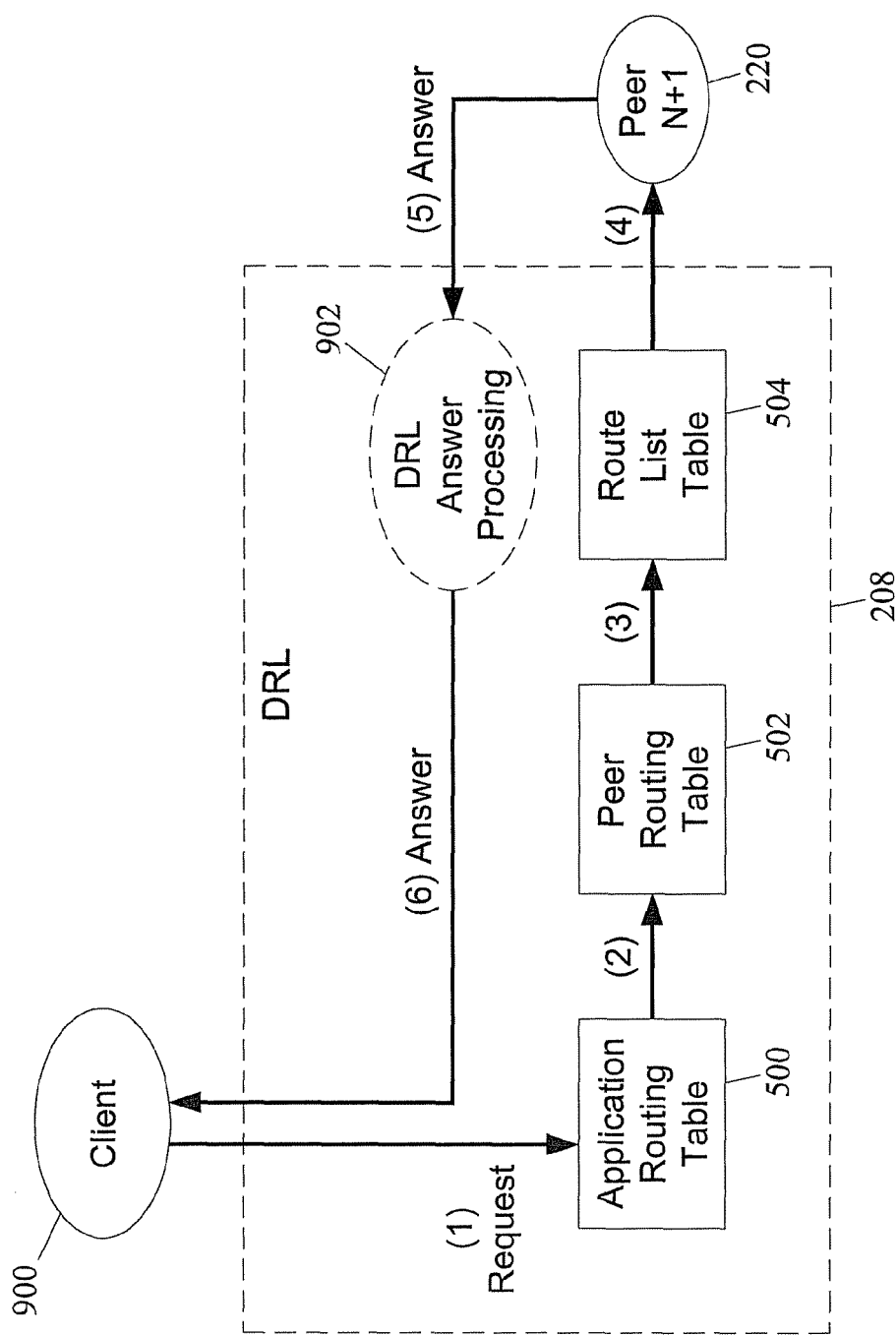
FIG. 9 is a block diagram illustrating an exemplary client-based local DSR application for providing local application routing at a Diameter node according to an embodiment of the subject matter described herein.

FIG. 9 is a block diagram illustrating an exemplary client-based local DSR application for providing local application routing at a Diameter node according to an embodiment of the subject matter described herein. Referring to FIG. 9, client 900 may send a Diameter Request message to DRL 208 which is received by ART 500. ART 500 is used to determine whether processing of the Diameter message by a Diameter application is required. In response to determining that Diameter application processing is required, the Diameter message is forwarded to Peer routing table 502 and then to route list table 504. Based on the result of lookups performed in tables 500-504, peer 220 is identified and the Diameter message is forwarded. After processing the Request, peer 220 returns an Answer message to DRL answer processing 902, which in turn sends the Answer message to client 900.

Figure 10:
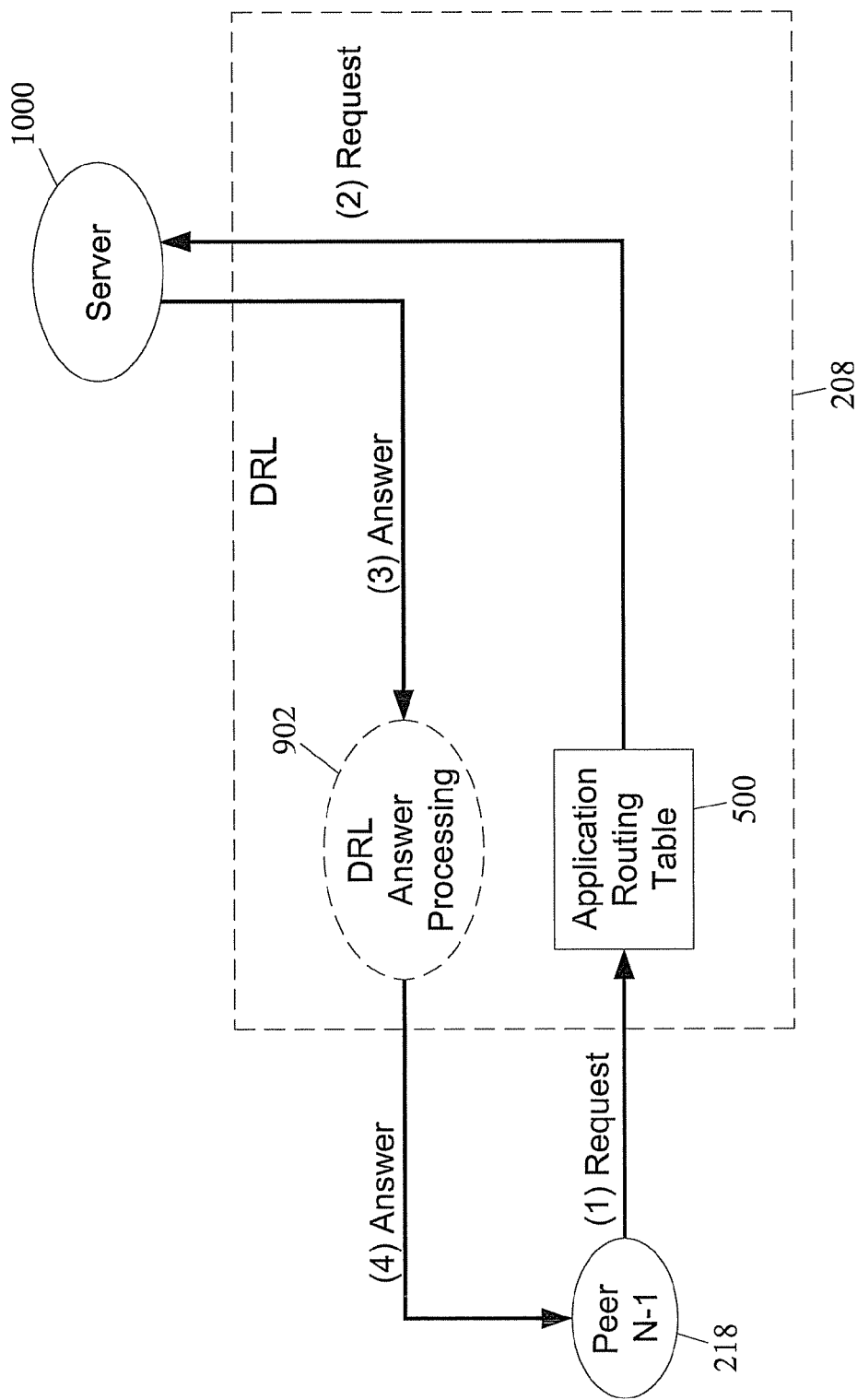
FIG. 10 is a block diagram illustrating an exemplary server-based local DSR application for providing local application routing at a Diameter node according to an embodiment of the subject matter described herein.

FIG. 10 is a block diagram illustrating an exemplary server-based local DSR application for providing local application routing at a Diameter node according to an embodiment of the subject matter described herein. Referring to FIG. 10, peer 218 may send a Diameter Request to DRL 208 which is received by ART 500. ART 500 is used to determine whether processing of the Diameter message by a Diameter application is required. In response to determining that Diameter application processing is required, the Diameter Request message is forwarded to server 1000. After processing the Request, server 1000 generates and returns a Diameter Answer message to DRL answer processing 902, which in turn sends the Answer message to peer 218.

Figure 11:
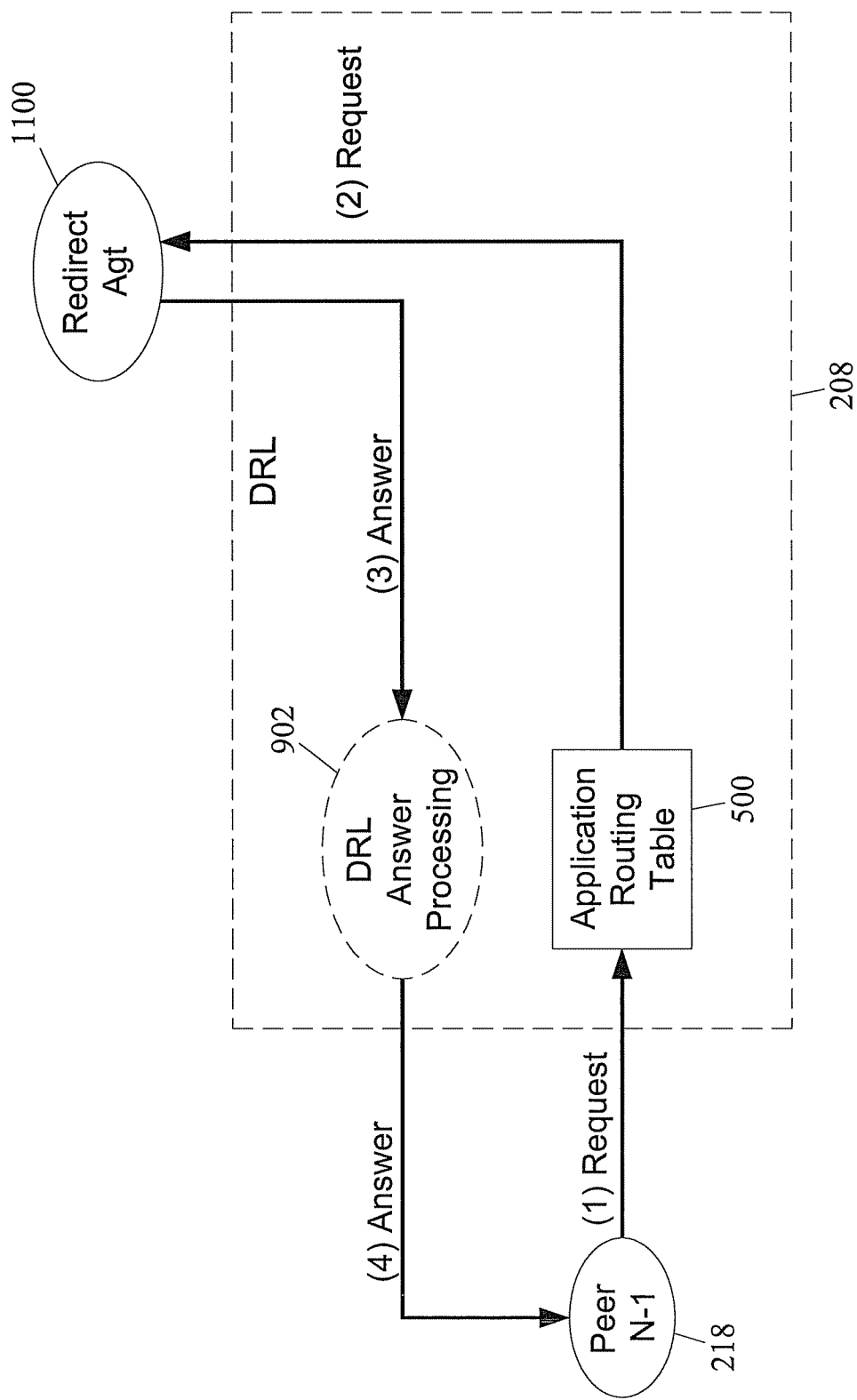
FIG. 11 is a block diagram illustrating an exemplary redirect agent-based local DSR application for providing local application routing at a Diameter node according to an embodiment of the subject matter described herein.

FIG. 11 is a block diagram illustrating an exemplary redirect agent-based local DSR application for providing local application routing at a Diameter node according to an embodiment of the subject matter described herein. Referring to FIG. 11, peer 218 may send a Diameter Request to DRL 208 which is received by ART 500. ART 500 is used to determine whether processing of the Diameter message by a Diameter application is required. In response to determining that Diameter application processing is required, the Diameter Request message is forwarded to redirect agent 1100. After processing the Request, redirect agent 1100 generates and returns a Diameter Answer message to DRL answer processing 902, which in turn sends the Answer message to peer 218.

Figure 12:
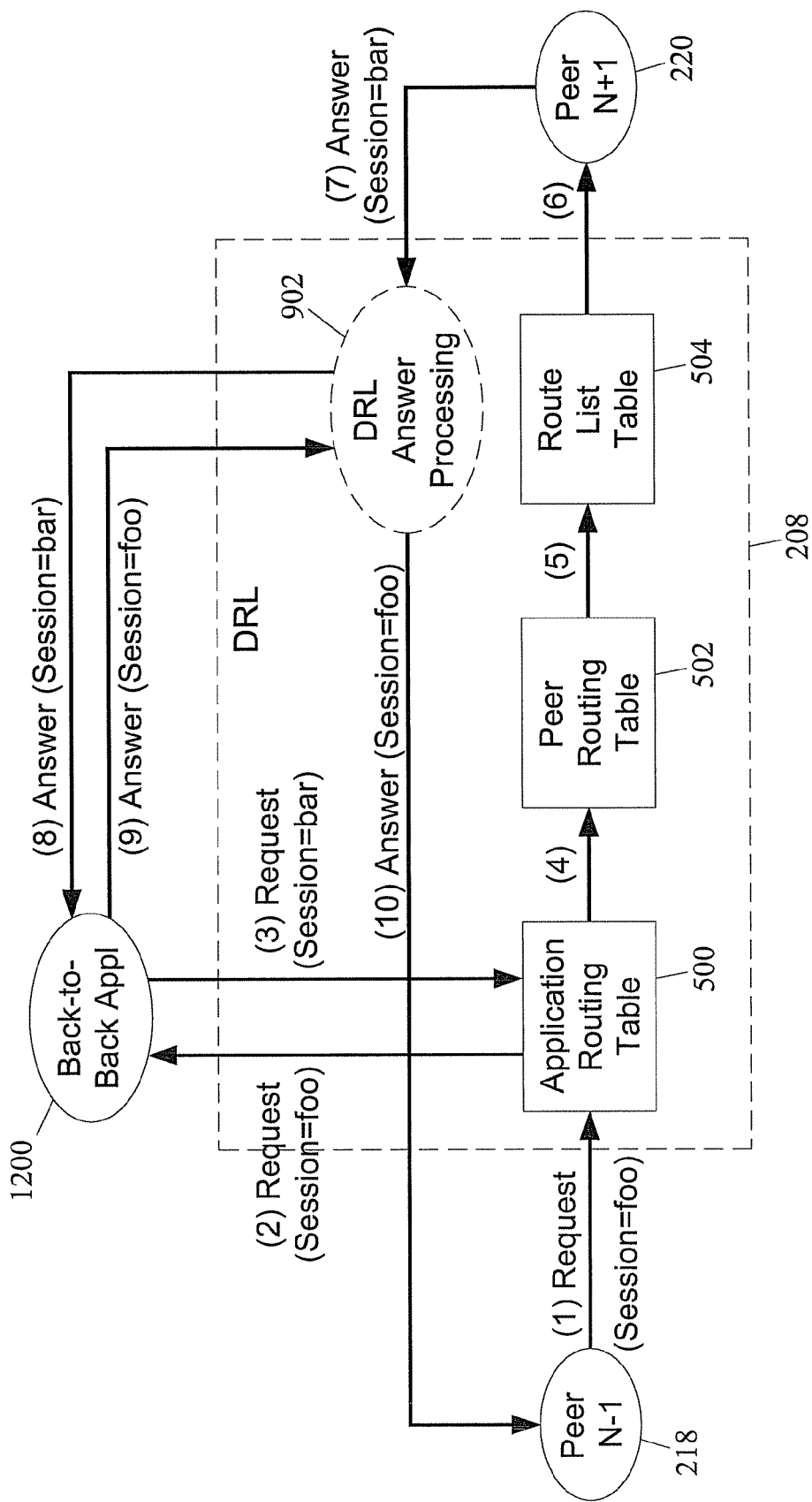
FIG. 12 is a block diagram illustrating an exemplary back-to-back application-based local DSR application for providing local application routing at a Diameter node according to an embodiment of the subject matter described herein.

FIG. 12 is a block diagram illustrating an exemplary back-to-back application-based local DSR application for providing local application routing at a Diameter node according to an embodiment of the subject matter described herein. Referring to FIG. 12, peer 218 may send a Diameter Request message for session=foo to DRL 208 which is received by ART 500. ART 500 is used to determine whether processing of the Diameter message by a Diameter application is required. In response to determining that Diameter application processing is required, the Diameter message is forwarded to back-to-back application 1200 for processing. After processing the Request for session=foo, back-to-back application 1200 returns a Request for session=bar to ART 500. ART 500 then forwards the Request for session=bar to peer routing table 502 and then to route list table 504. Based on the result of lookups performed in tables 500-504, peer 220 is identified and the Diameter message is forwarded. After processing the Request message for session=bar, peer 220 returns an Answer message for session=bar to DRL answer processing 902, which in turn sends the Answer message back to back-to-back application 1200. Back-to-back application 1200 processes the message and returns an Answer message for session=foo to DRL answer processing 902, which in turn sends the Answer message for session=foo to peer 218 corresponding to its Request for session=foo.

Figure 13:
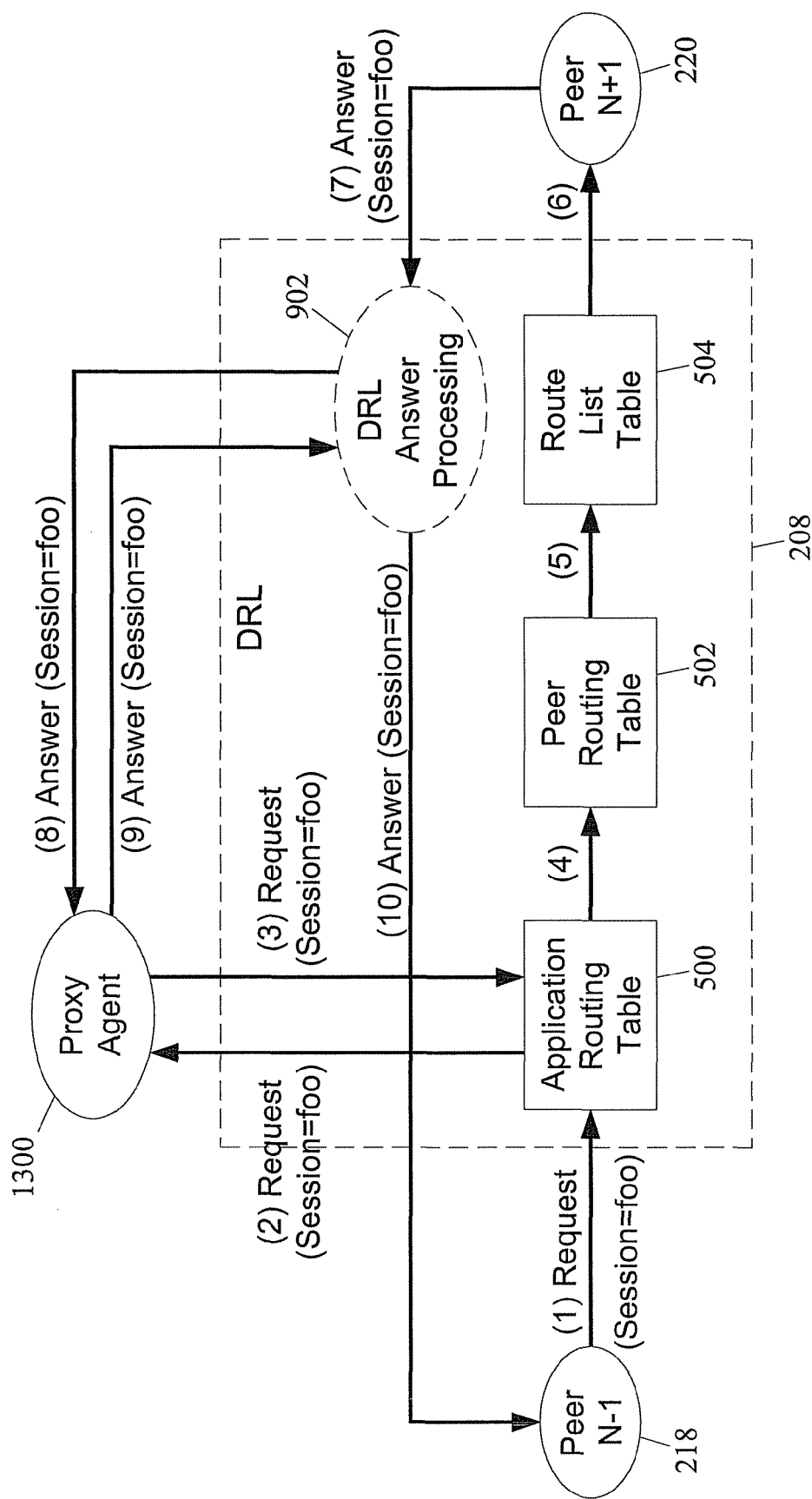
FIG. 13 is a block diagram illustrating an exemplary proxy agent-based local DSR application for providing local application routing at a Diameter node according to an embodiment of the subject matter described herein.

FIG. 13 is a block diagram illustrating an exemplary proxy agent-based local DSR application for providing local application routing at a Diameter node according to an embodiment of the subject matter described herein. Referring to FIG. 13, peer 218 may send a Diameter Request message for session=foo to DRL 208 which is received by ART 500. ART 500 is used to determine whether processing of the Diameter message by a Diameter application is required. In response to determining that Diameter application processing is required, the Diameter message is forwarded to proxy agent 1300 for processing. After processing the Request for session=foo, proxy agent 1300 returns a Request for session=foo to ART 500. ART 500 then forwards the Request for session=foo to peer routing table 502 and then to route list table 504. Based on the result of lookups performed in tables 500-504, peer 220 is identified and the Diameter message is forwarded. After processing the Request message for session=foo, peer 220 returns an Answer message for session=foo to DRL answer processing 902, which in turn sends the Answer message back to proxy agent 1300. Proxy agent 1300 processes the message and returns an Answer message for session=foo to DRL answer processing 902, which in turn sends the Answer message for session=foo to peer 218 corresponding to its Request for session=foo.

Figure 14:
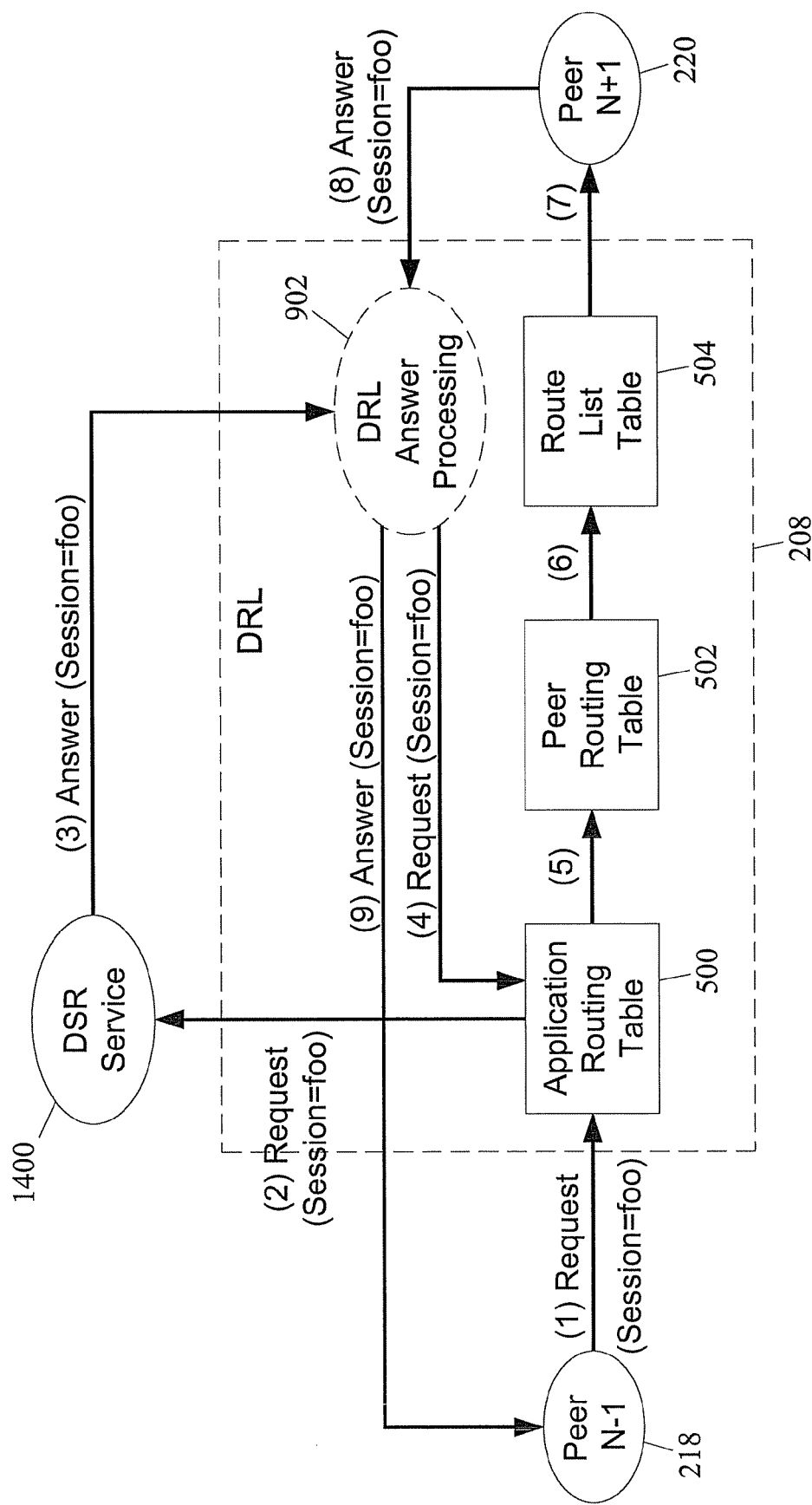
FIG. 14 is a block diagram illustrating an exemplary local DSR application scenario in which service drops out for providing local application routing at a Diameter node according to an embodiment of the subject matter described herein.

FIG. 14 is a block diagram illustrating an exemplary local DSR application scenario in which service drops out for providing local application routing at a Diameter node according to an embodiment of the subject matter described herein. Referring to FIG. 14, peer 218 may send a Diameter Request message for session=foo to DRL 208 which is received by ART 500. ART 500 is used to determine whether processing of the Diameter message by a Diameter application is required. In response to determining that Diameter application processing is required, the Diameter message is forwarded to DSR service 1400 for processing. After processing the Request for session=foo, DSR service 1400 sends a Diameter Answer message for session=foo to DRL answer processing 902, which in turn sends another Request message for session=foo to ART 500. ART 500 then forwards the Request for session=foo to peer routing table 502 and then to route list table 504. Based on the result of lookups performed in tables 500-504, peer 220 is identified and the Diameter message is forwarded. After processing the Request message for session=foo, peer 220 returns an Answer message for session=foo to DRL answer processing 902, which in turn sends the Answer message back to peer 218 corresponding to its Request for session=foo.

Figure 15:
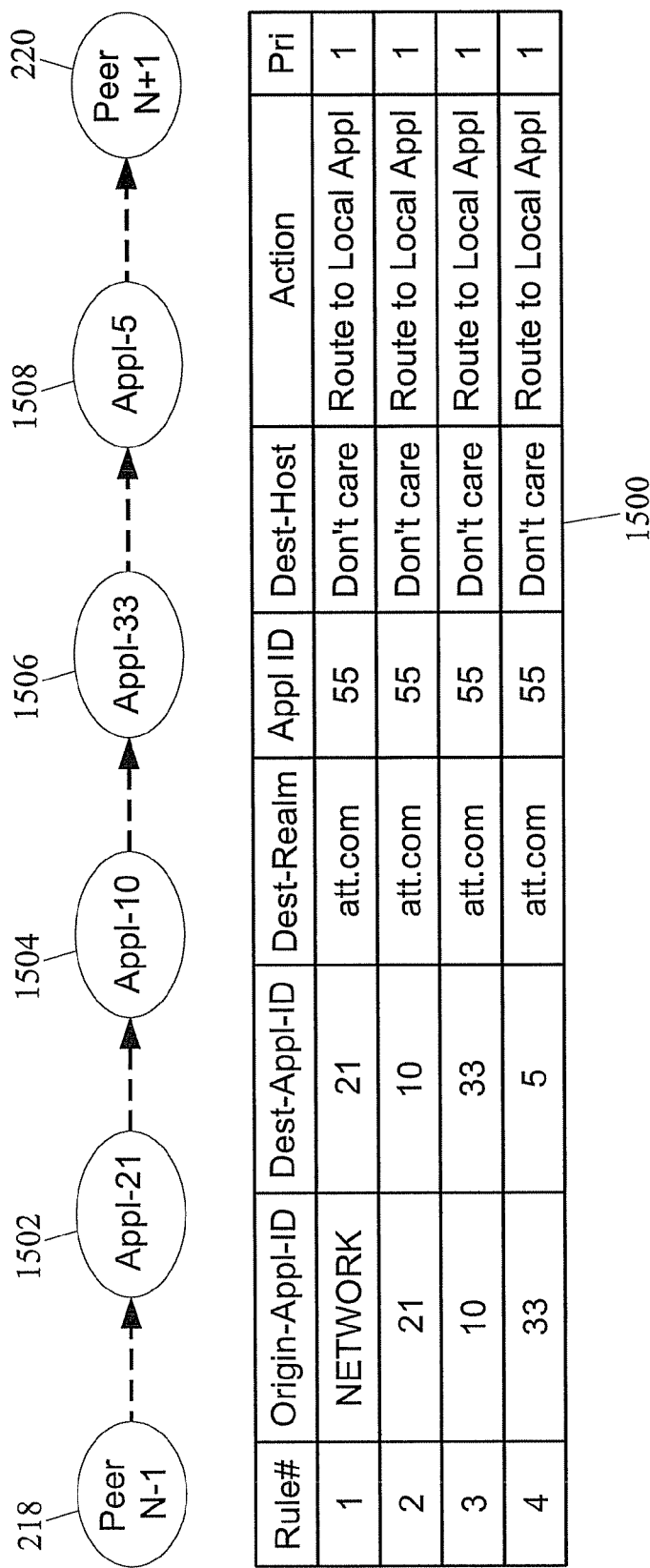
FIG. 15 is a block diagram illustrating an exemplary routing scenario for routing message to local DSR applications for providing local application routing at a Diameter node according to an embodiment of the subject matter described herein.

FIG. 15 is a block diagram illustrating an exemplary routing scenario for routing message to local DSR applications for providing local application routing at a Diameter node according to an embodiment of the subject matter described herein. In order to support a variety of local applications serving as different types Diameter nodes (client, proxy, etc), DRL should treat local applications similar to peers from a message routing perspective.

It is appreciated that "pending transaction" queues may be supported for backwards routing of Answer responses. For example, when a local client or server application sends a Request message, DRL may need to route the Answer response back to that application. When DRL routes a Request message to a client of server application, DRL may need to route the Answer response from the local application back to the peer from which the Request was received. It may be appreciated that a Request message sent to a local application may or may not be saved in a "pending transaction" queue and that hop-by-hop IDs may be used for correlating messages exchanged between DRL and local applications without departing from the scope of the subject matter described herein.

Further, in one possible embodiment, it is appreciated that Answer responses from local applications may be processed identically to Answer responses received from peers. For example, when DRL receives a normal (e.g., Success) Answer response from any local application, the internal DRL-to-Local Application transaction (similar to Diameter peer-to-peer transaction) is completed and DRL will propagate the Answer response to the peer which sent the original Request message that invoked application processing.

In order to support one or more services (via local DSR Applications) to the same message, DRL will re-search the ART after each application invocation to determine whether any additional applications need to be invoked based on message content (which may have been changed by the previous application invocation)

In order to support the control of local application sequencing, the "origin application ID" will be used to search the ART. Each time the ART is searched, the "origin application ID" will be set to local application ID from which the message was received. When the initial message is received from a peer, DRL will set the "origin local application ID" to a default value indicating that the source of the message was a peer (e.g., "NETWORK" or "DRL"). For example, if the operator wanted to invoke four local DSR applications 21, 10, 33, and 5, in that priority order, whenever a message was received from a peer with Destination-Realm="att.com" and Application ID=55, then the following ART rules would be configured.

In order to prevent inter-local application message processing loops, DRL will utilize a DSR-specific Internal-Route-Record AVP, similar to the Route-Record AVP used to detect internal message looping. Each time DRL invokes a local application for an end-to-end Diameter transaction, it will add an Internal-Route-Record AVP containing the identity of the local application which previously processed the message. Each time DRL searches the ART and finds one or more rules which match, it must validate that the Destination-Application-ID of the highest rule does not match any of the Internal-Route-Record AVP values (indication that the application has already been invoked for this end-to-end transaction). If a message loop is detected, DRL will abandon routing for this message and send a Diameter_UNABLE_TO_DELIVER Answer response to the peer and assert a local OAM alarm or event to notify the operator of a potential ART configuration problem. It may be appreciated, however, that when DRL completes application routing, DRL may delete all Internal-Route-Record AVPs from the message prior to searching the PRT.

Figure 16:
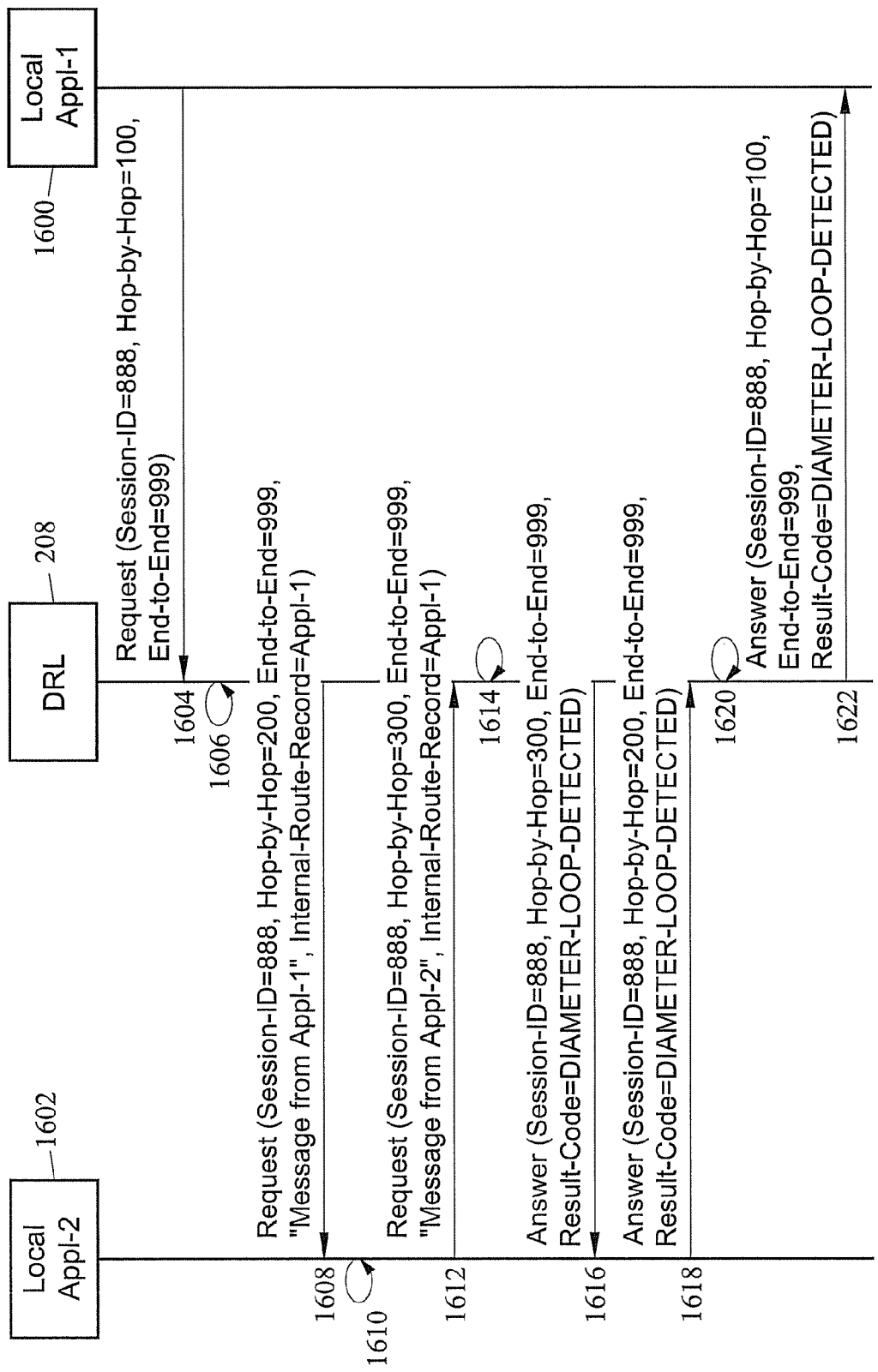
FIG. 16 is a message sequence diagram illustrating an exemplary local DSR application routing where the DRL detects internal message looping according to an embodiment of the subject matter described herein.

FIG. 16 is a message sequence diagram illustrating an exemplary local DSR application routing where the DRL detects internal message looping according to an embodiment of the subject matter described herein. In the use case shown in FIG. 16, Appl-2 wants to stay in the signaling path but is not creating a new Session. Referring to FIG. 16, DRL 308 may be located between local application-1 1600 and local application-2 1602.

At step 1604, a Request message may be sent from local application-1 1600 to DRL 308 indicating Session-ID=888, Hop-by-Hop=100, and End-to-End=999.

At step 1606, DRL 308 may receive a new transaction and search its ART using Origin-Appl-Name=Appl-1. The result of the search may include finding a match for Appl-2. DRL 308 may then initiate a new transaction to Appl-2 and map (Appl-1, Hop=100) to (Appl-2, Hop=200). DRL 308 may save Appl-1 and Appl-2 in "List of local applications invoked".

At step 1608, a Request message may be sent from DRL 308 to local application-2 1602 indicating (Session-ID=888, Hop-by-Hop=200, End-to-End=999, "Message from Appl-1", Internal-Route-Record=Appl-1).

At step 1610, local application-2 1602 may want to stay in signaling path. Therefore, local application-2 1602 may apply any changes to the message received in step 1608 and initiate a new peer-to-peer transaction "300" to DRL 308.

At step 1612, local application-2 1602 may send a Request message to DRL 308 indicating (Session-ID=888, Hop-by-Hop=300, End-to-End=999, "Message from Appl-2", Internal-Route-Record=Appl-1).

At step 1614, DRL 308 may receive a new transaction and search its ART using Origin-Appl-Name=Appl-2. The result of the search may include finding a match for Appl-1 1600, which has already processed the transaction.

Because local application looping is not allowed, DRL 308 may send an Answer response with Result-Code set to "Diameter_LOOP_DETECTED". For example, at step 1616, DRL 308 may send an Answer message to local application-2 1602 indicating (Session-ID=888, Hop-by-Hop=300, End-to-End=999, Result-Code=Diameter_LOOP_DETECTED).

At step 1618, local application-2 1602 may send an Answer message to DRL 308 indicating (Session-ID=888, Hop-by-Hop=200, End-to-End=999, Result-Code=Diameter_LOOP_DETECTED).

At step 1620, DRL 308 may correlate (Appl-2, Hop=200) to (Appl-1, Hop=100). It may be appreciated that this mapping was also performed in step 1606 above.

At step 1622, DRL 308 may send an Answer message to local application-1 1600 indicating (Session-ID=888, Hop-by-Hop=100, End-to-End=999, Result-Code=Diameter_LOOP_DETECTED).

Figure 17:
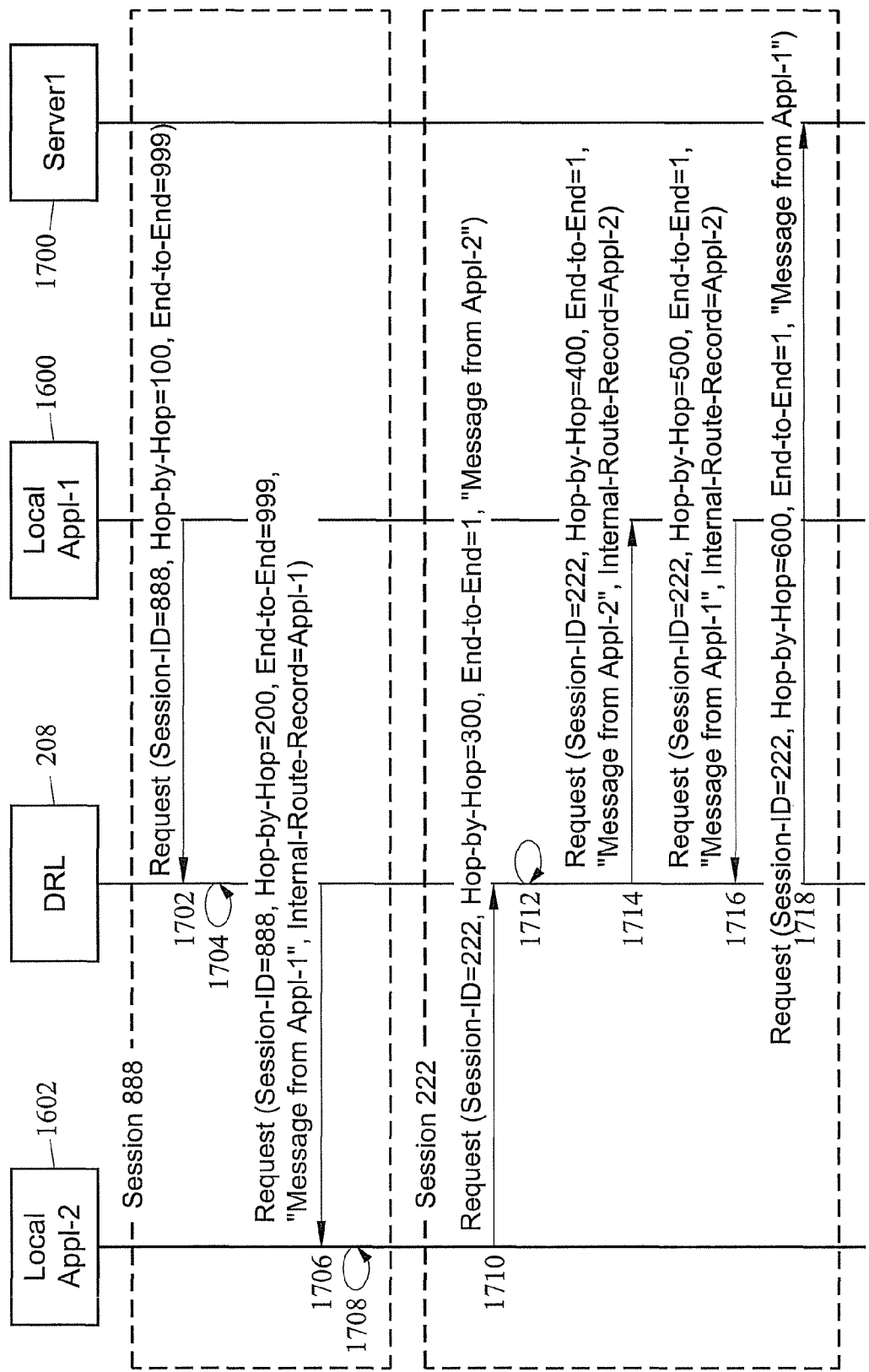
FIG. 17 is a message sequence diagram illustrating an exemplary local DSR application routing where DRL internal message looping is not detected according to an embodiment of the subject matter described herein.

FIG. 17 is a message sequence diagram illustrating an exemplary local DSR application routing where DRL internal message looping is not detected according to an embodiment of the subject matter described herein. In the use case shown in FIG. 17, local application-2 1602 may include a back-to-back proxy that creates a new session. Referring to FIG. 17, in addition to local application-1 1600, local application-2 1602, and DRL 308, a server 1700 is shown.

At step 1702, local application-1 1600 may send a Request message to DRL 308 indicating (Session-ID=888, Hop-by-Hop=100, End-to-End=999).

At step 1704, DRL 308 may receive a new transaction and search its ART using Origin-Appl-Name=Appl-1. The result of the search may include finding a match for Appl-2. DRL 308 may then initiate a new transaction to Appl-2 1602 with Internal-Route-Record=Appl-1 and map (Appl-1, Hop=100) to (Appl-2, Hop=200).

At step 1706, DRL 308 may send a Request message to local application-2 1602 indicating (Session-ID=888, Hop-by-Hop=200, End-to-End=999, "Message from Appl-1", Internal-Route-Record=Appl-1).

At step 1708, Appl-2 1602 may be a back-to-back proxy agent which interworks between two sessions (e.g., session 888 and session 222). When Session-ID=888 is received from Appl-1 1600, Appl-2 1602 may open a new Session-ID=222 and initiate a new end-to-end transaction "300" to DRL 308 which does not forward the Internal-Route-Record AVPs.

At step 1710, session 222 may begin when local application-2 1602 sends a Request message to DRL 308 indicating (Session-ID=222, Hop-by-Hop=300, End-to-End=1, "Message from Appl-2").

At step 1712, DRL 308 may receive a new transaction and search its ART using Origin-Appl-Name=Appl-2. The result of the search may include finding a match for Appl-1. However, since no Internal-Route-Record AVPs exist, there are no message loop issues and the transaction may be routed.

At step 1714, DRL 308 may send a Request message to local application-1 1600 indicating (Session-ID=222, Hop-by-Hop=400, End-to-End=1, "Message from Appl-2", Internal-Route-Record=Appl-2).

At step 1716, local application-1 1600 may send a Request message to DRL 308 indicating (Session-ID=222, Hop-by-Hop=500, End-to-End=1, "Message from Appl-1", Internal-Route-Record=Appl-2).

At step 1718, DRL 308 may send a Request message to server1 1700 indicating (Session-ID=222, Hop-by-Hop=600, End-to-End=1, "Message from Appl-1").

In order for DRL 308 to support the ability for local applications to modify a message but not remain in the signaling path for the remainder of that transaction or session, the following DSR-specific Answer message enhancements may be used. First, the ability to return an "updated message" in the Answer response. Second, the ability for an local application to notify DRL that it should continue routing the original Request message rather than propagating the Answer response to a peer.

When a local DSR application wants to notify DRL 308 that it has completed application processing and that Request message routing should continue, the local DSR application must set the Result-Code in the Answer response to the DSR application-specific value "Continue". It may be appreciated that this contrasts with normal DRL processing which would propagate the Answer to the peer).

If the local application has modified the message, it may return the updated message in a DSR application-specific AVP called "Updated-Message". If the Updated-Message AVP is present, then DRL 308 will continue local application routing with the new message. If the Updated-Message AVP is not present, then DRL 308 may continue local application routing with the original message. It is further appreciated that the Updated-Message AVP may only be required if DRL 308 and the local application cannot access the same shared memory space. Due to the size of Diameter messages, it may be more efficient to modify messages in place rather than copying them between DRL and local applications.

Figure 18:
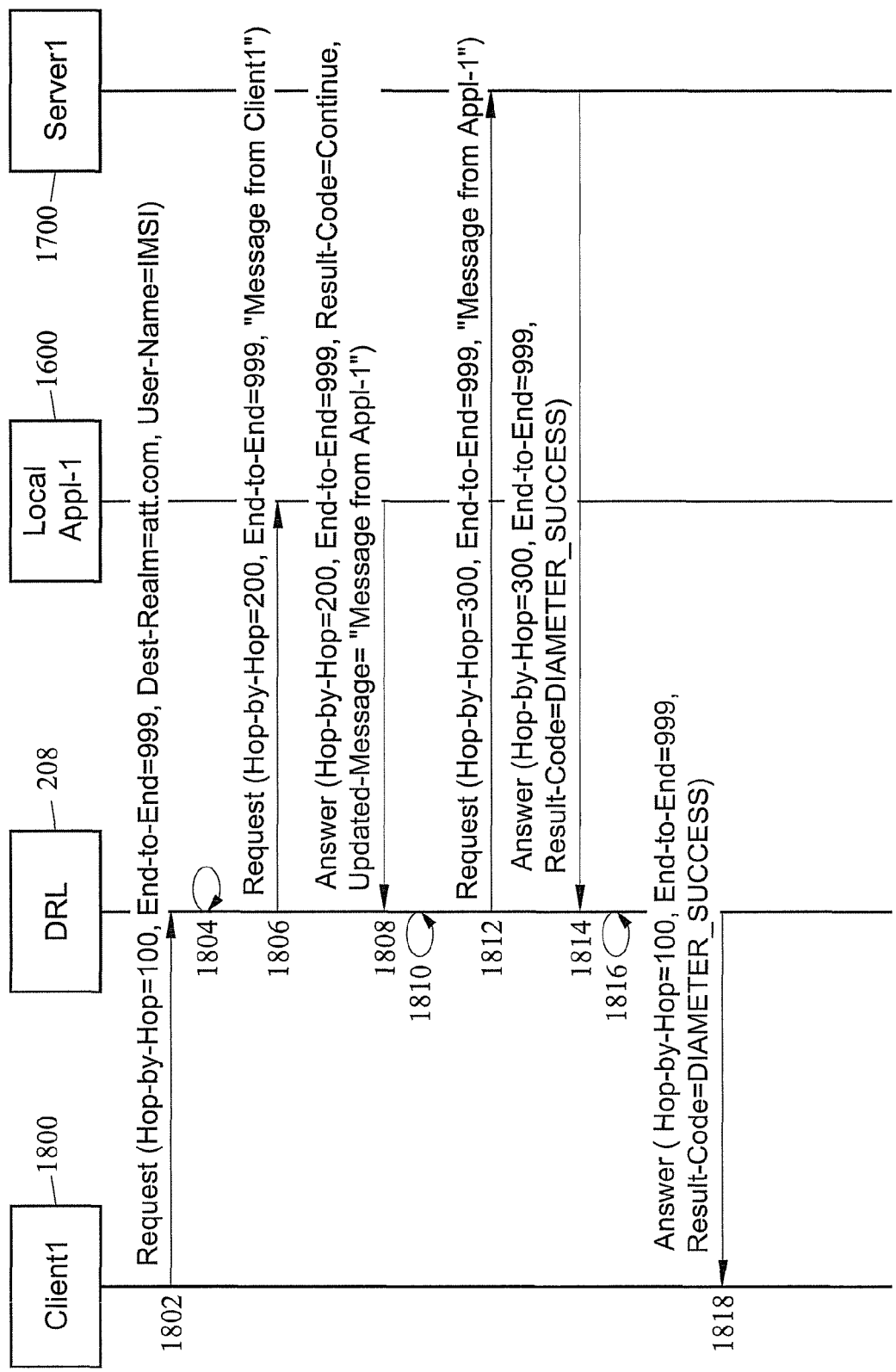
FIG. 18 is a message sequence diagram illustrating an exemplary local DSR application routing where the local proxy application modifies an ingress message and drops out of the signaling path according to an embodiment of the subject matter described herein.

FIG. 18 is a message sequence diagram illustrating an exemplary local DSR application routing where the local proxy application modifies an ingress message and drops out of the signaling path according to an embodiment of the subject matter described herein. Referring to FIG. 18, at step 1802, client1 1800 may send a Request message to DRL 308 indicating (Hop-by-Hop=100, End-to-End=999, Dest-Realm=att.com, User-Name=IMSI).

At step 1804, DRL 308 may search its ART using Origin-Appl-Name="Network". _find match_LAPR Action="Route to Local DSR Appl-1". DRL 308 may then create a new internal transaction "200" for Appl-1 1600 and map (Client1, Hop=100) to (Appl-1, Hop=200).

At step 1806, DRL 308 may send a Request message to local application-1 1600 indicating (Hop-by-Hop=200, End-to-End=999, "Message from Client1").

At step 1808, local application-1 1600 may send an Answer message to DRL 308 indicating (Hop-by-Hop=200, End-to-End=999, Result-Code=Continue, Updated-Message="Message from Appl-1").

At step 1810, the Answer response from Appl-1 1600 may include the application-specific Result-Code=Continue (i.e., Appl-1 is requesting that Request message processing should continue). Therefore, DRL 308 may remove the (Client1, Hop=100) to (Appl-1, Hop=200) mapping (performed in step 1804 above) and re-search its ART with Origin-Appl-Name=Appl-1. Finding no additional matches, DRL 308 may then search its PRT with the message received from Appl-1

1600 and find a rule with Route List-5 which resolves to Route-2 (Server1 1700). DRL 308 may then create a (Client1, Hop=100) to (Server1, Hop=300) mapping.

At step 1812, DRL 308 may send a Request message to server1 1700 indicating (Hop-by-Hop=300, End-to-End=999, "Message from Appl-1").

At step 1814, server1 1700 may send an Answer message to DRL 308 indicating (Hop-by-Hop=300, End-to-End=999, Result-Code=DIAMETER_SUCCESS).

At step 1816, DRL 308 may correlate (Server1, Hop=300) to (Client1, Hop=100). It is appreciated that this mapping was performed in step 1810 above.

At step 1818, DRL 308 may send an Answer message to client1 1800 indicating (Hop-by-Hop=100, End-to-End=999, Result-Code=DIAMETER_SUCCESS).

Figure 19:
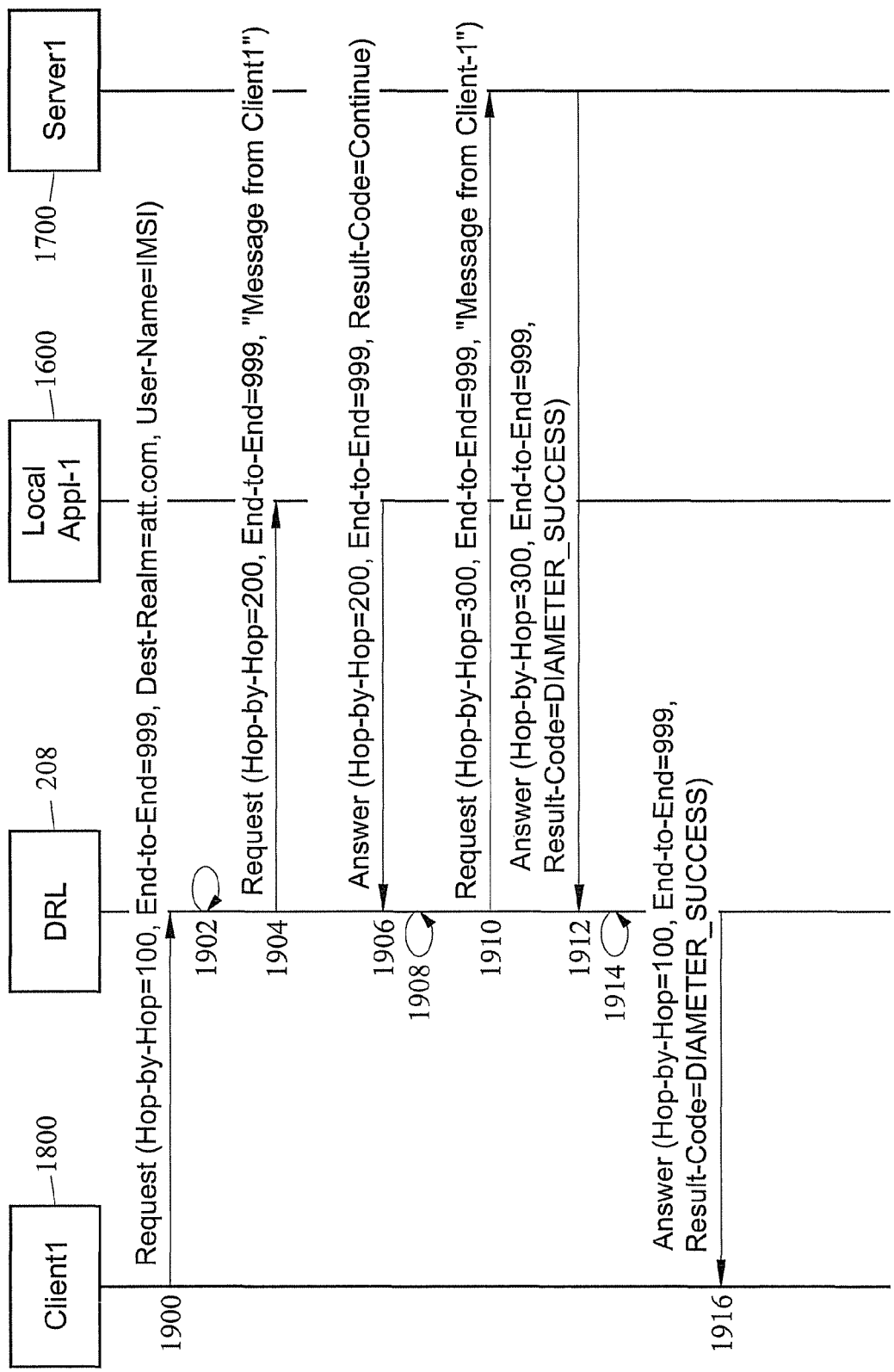
FIG. 19 is a message sequence diagram illustrating an exemplary local DSR application routing where the local proxy application does not modify the ingress message and drops out of the signaling path according to an embodiment of the subject matter described herein.

FIG. 19 is a message sequence diagram illustrating an exemplary local DSR application routing where the local proxy application does not modify the ingress message and drops out of the signaling path according to an embodiment of the subject matter described herein.

At step 1900, client1 1800 may send a Request message to DRL 308 indicating (Hop-by-Hop=100, End-to-End=999, Dest-Realm=att.com, User-Name=IMSI).

At step 1902, DRL 308 may search its ART with Origin-Appl-Name="Network" and finds LAPR Action="Route to Local DSR Appl-1". It may create a new internal transaction "200" for Appl-1 1600 and map (Client1, Hop=100) to (Appl-1, Hop=200).

At step 1904, DRL 308 may send a Request message to local application-1 1600 indicating (Hop-by-Hop=200, End-to-End=999, "Message from Client1").

At step 1906, local application-1 1600 may return an Answer message to DRL 308 indicating (Hop-by-Hop=200, End-to-End=999, Result-Code=Continue).

At step 1908, it is appreciated that Answer response from Appl-1 has application-specific Result-Code=Continue (i.e., Appl-1 is requesting that Request message processing should continue). Therefore, DRL 208 may remove the (Client1, Hop=100) to (Appl-1, Hop=200) mapping performed in step 1902 above and re-search its ART with Origin-Appl-Name=Appl-1. Finding no additional matches, DRL 208 may then search its PRT with the message received from Client-1 1800 and find a rule with Route List-5 which resolves to Route-2 (i.e., Server1 1700). DRL 208 may then create (Client1, Hop=100) to (Server1, Hop=300) mapping.

At step 1910, DRL 308 may send a Request message to server1 1700 indicating (Hop-by-Hop=300, End-to-End=999, "Message from Client-1").

At step 1912, server1 1700 may return an Answer message to DRL 308 indicating (Hop-by-Hop=300, End-to-End=999, Result-Code=DIAMETER_SUCCESS).

At step 1914, DRL 308 may correlate (Server1, Hop=300) to (Client1, Hop=100). It is appreciated that this mapping was performed in step 1908 above.

At step 1916, DRL 308 may send an Answer message to client 1 1800 indicating (Hop-by-Hop=100, End-to-End=999, Result-Code=DIAMETER_SUCCESS).

Application Routing Table

Contents

The following items may be stored in ART. It is appreciated, however, that these are for illustration purposes only and are not intended to be limiting.

Rule Name—operator-provided name for rule identification.

Rule Priority—if a table query finds multiple matches, then the entry with the highest (lowest value) priority will be selected.

Rule Message Selection Parameters: message parameters that the user can specify as a criteria for message matching
 (M) Destination-Realm—similar to Diameter Realm Routing Table, core data type: OctetString
 (M) Application ID—similar to Diameter Realm Routing Table, 32-bit value
 (M) Destination-Host—similar to "Host Identity" in Diameter Peer Table, core data type: OctetString
 (D) Origin-Realm—identifies the realm from which the message was originated. This is typically a Client node. This is currently categorized as "D"esirable but not mandatory for supporting the basic routing capabilities, core data type: OctetString
 (D) Origin-Host—identifies the Host from which the message was originated
 (D) User-Name—identifies the user for which this service is being invoked, core data type: OctetString
 (D) Command-Code—identifies the request message type. Any value should be supported to support adding application-specific command-codes in the future, 24-bit value Origin-Application-ID: an additional ART search parameter used for sequencing local application execution.

Rule Action—defines the action to perform when this rule is invoked. Actions supported:
 Route to Local DSR Application—the message will be routed to the local DSR application identified by the rule's Destination-Application-ID field (see below).
 Send Answer Response—an Answer response will be sent using the rule's Result-Code field (see below) and no further message processing will occur.

Rule Action Parameters:
Destination-Application-ID—the message will be routed to this local DSR Application ID when the Action is set to "Route to Local DSR Application"
Result Code—the Result-Code AVP value to use when the "Action" is set to "Send Answer Response". Default value is 3002 "Diameter_UNABLE_TO_DELIVER"

Local DSR Application Routing Use Cases

Figure 20:
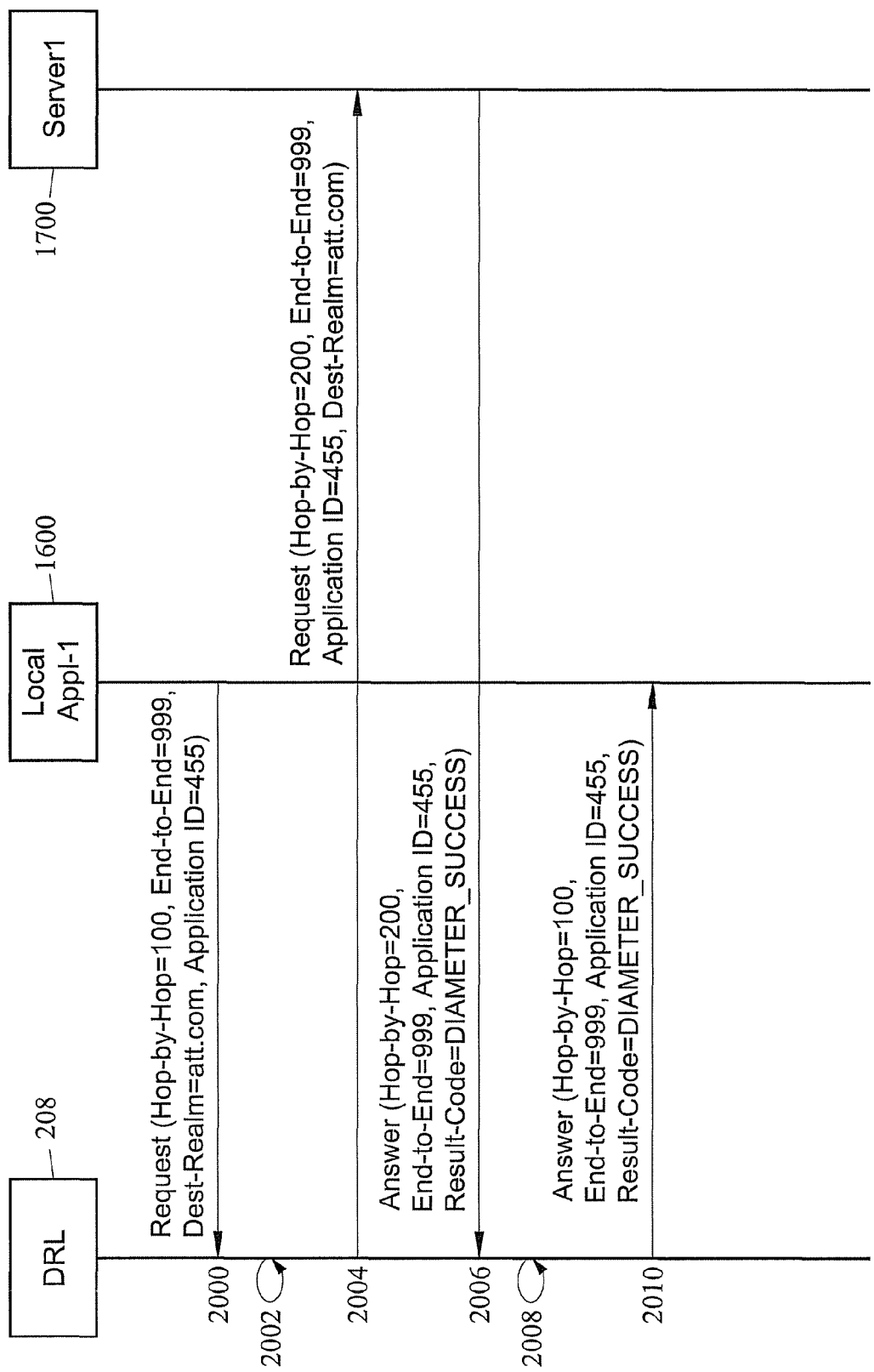
FIG. 20 is a message sequence diagram illustrating an exemplary local DSR application routing use case where the local application initiates a transaction to a remote server according to an embodiment of the subject matter described herein.

FIG. 20 is a message sequence diagram illustrating an exemplary local DSR application routing use case where the local application initiates a transaction to a remote server according to an embodiment of the subject matter described herein. Referring to FIG. 20, at step 2000, local application-1 1600 may send a Request message to DRL 308 indicating (Hop-by-Hop=100, End-to-End=999, Dest-Realm=att.com, Application ID=455).

At step 2002, DRL 308 may receive a new transaction and search its ART using Origin-Appl-Name=Appl-1. Finding no matches (i.e., no other local application processing required), DRL 308 may then search its PRT and find a rule for Route List-5 which resolves to Route-2 (Server1). DRL 308 may then map (Appl-1, Hop=100) to (Server1, Hop=200).

At step 2004, DRL 308 may send a Request message to server1 1700 indicating (Hop-by-Hop=200, End-to-End=999, Application ID=455, Dest-Realm=att.com).

At step 2006, server1 1700 may return an Answer message to DRL 308 indicating (Hop-by-Hop=200, End-to-End=999, Application ID=455, Result-Code=DIAMETER_SUCCESS).

At step 2008, DRL 308 may correlate (Server1, Hop=200) to (Appl-1, Hop=100). It may be appreciated that this mapping was done in step 2002 above.

At step 2010, DRL 308 may send an Answer message to local application-1 1600 indicating (Hop-by-Hop=100, End-to-End=999, Application ID=455, Result-Code=DIAMETER_SUCCESS).

Figure 21:
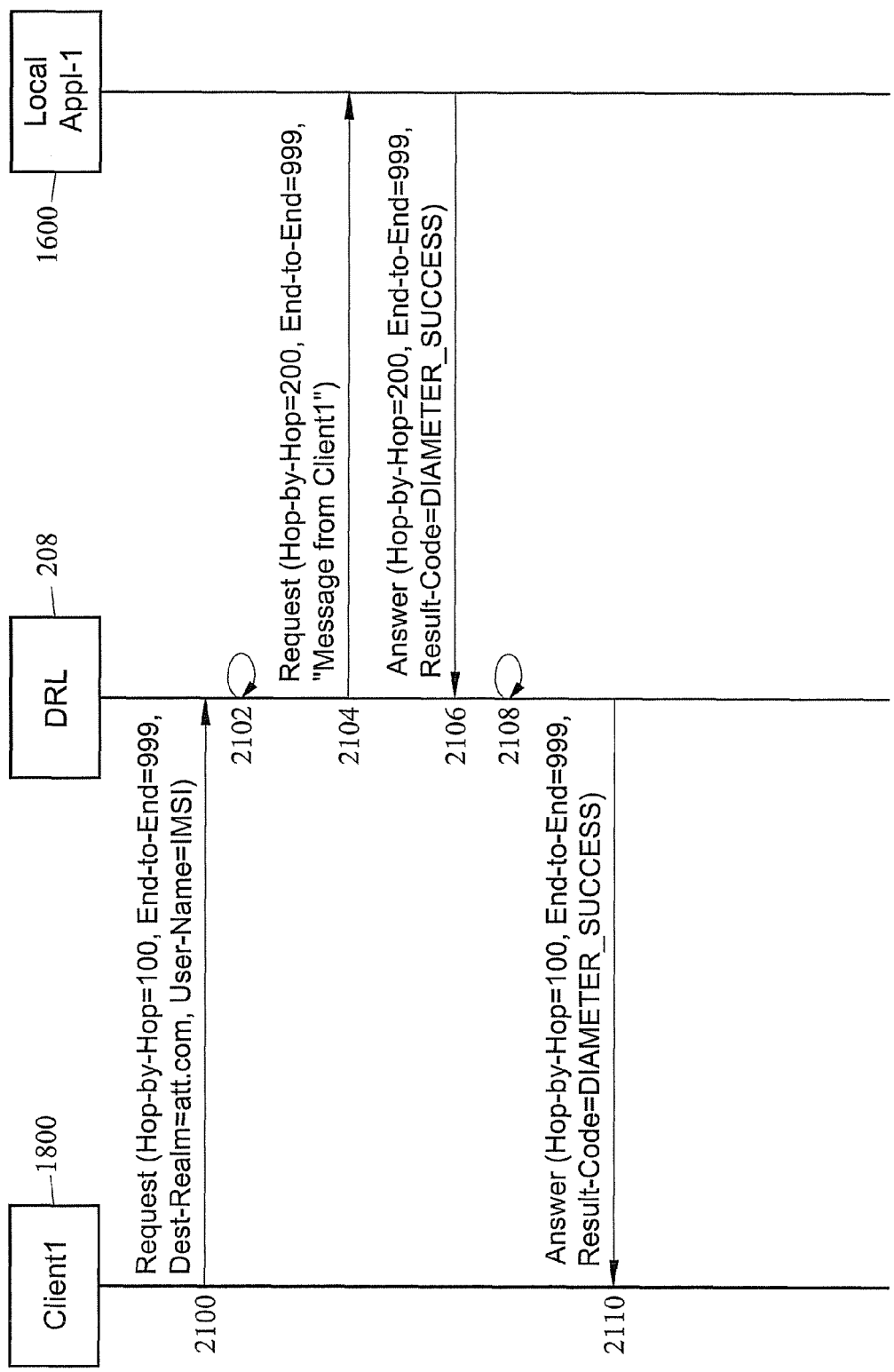
FIG. 21 is a message sequence diagram illustrating an exemplary local DSR application routing use case where the local server application receives and processes a request from a remote client according to an embodiment of the subject matter described herein.
Figure 22:
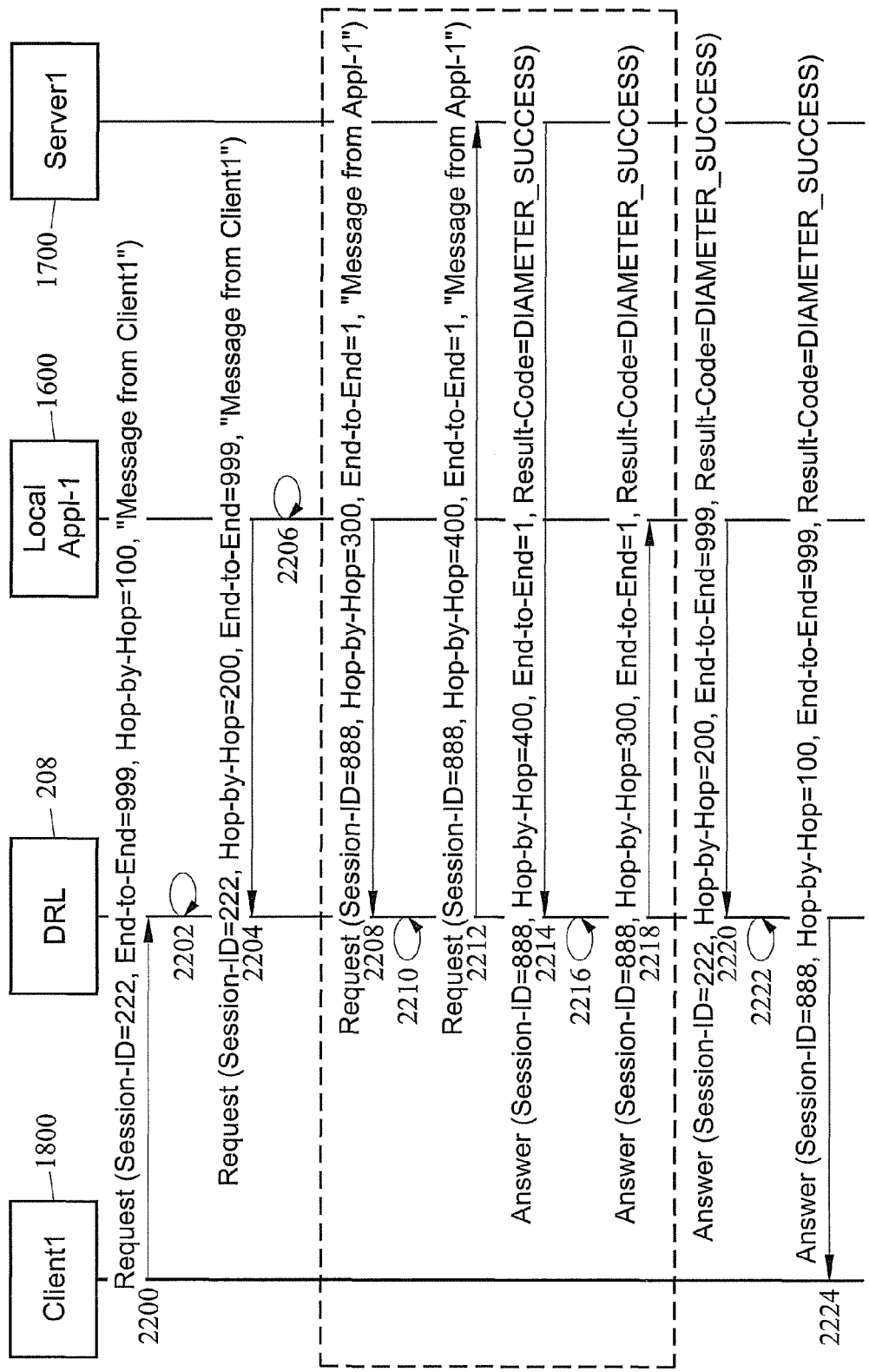
FIG. 22 is a message sequence diagram illustrating an exemplary local DSR application routing use case where the local proxy application stays in the signaling path by creating a new session according to an embodiment of the subject matter described herein.

FIG. 21 is a message sequence diagram illustrating an exemplary local DSR application routing use case where the local server application receives and processes a request from a remote client according to an embodiment of the subject matter described herein. Referring to FIG. 22, at step 2100, client1 1800 may send a Request message to DRL 308 indicating (Hop-by-Hop=100, End-to-End=999, Dest-Realm=att.com, User-Name=IMSI).

At step 2102, DRL 308 may search its ART using Origin-Appl-ID="Network" and find rule with Action="Route to Local DSR" and Destination-Appl-ID=1. DRL 308 may then create a new internal transaction "200" for Appl-1 and map (Client1, Hop=100) to (Appl-1, Hop=200).

At step 2104, DRL 308 may send a Request message to local application-1 1600 indicating (Hop-by-Hop=200, End-to-End=999, "Message from Client1").

At step 2106, local application-1 1600 may return an Answer message indicating (Hop-by-Hop=200, End-to-End=999, Result-Code=DIAMETER_SUCCESS).

At step 2108, DRL 308 may correlate (Appl-1, Hop=200) to (Client1, Hop=100). It may be appreciated that this mapping was done in step 2102 above.

At step 2110, DRL 308 may send an Answer message to client1 1800 indicating (Hop-by-Hop=100, End-to-End=999, Result-Code=DIAMETER_SUCCESS).

FIG. 22 is a message sequence diagram illustrating an exemplary local DSR application routing use case where the local proxy application stays in the signaling path by creating a new session according to an embodiment of the subject matter described herein. In the use case shown in FIG. 22, Appl-1 1600 is a back-to-back Proxy Agent which creates a new Session. Most likely the Destination-Host was addressed to the DSR Application.

At step 2200, client1 1800 may send a Request message to DRL 308 indicating (Session-ID=222, End-to-End=999, Hop-by-Hop=100, "Message form Client1").

At step 2202, DRL 308 may search its ART using Origin-Appl-ID="Network" and find a rule with Action="Route to Local DSR" and Destination-Appl-ID=1. DRL 308 may then create a new internal transaction "200" for Appl-1 and map (Client1, Hop=100) to (Appl-1, Hop=200).

At step 2204, DRL 308 may send a Request message to local application-1 1600 indicating (Session-ID=222, Hop-by-Hop=200, End-to-End=999, "Message from Client1").

At step 2206, Appl-1 1600 may be a back-to-back Proxy Agent which interworks between two sessions. When Session-ID=888 is received, Appl-1 1600 may open a new Session-ID=222 and initiate a new end-to-end transaction "1" to DRL 308.

At step 2208, local application-1 1600 may send a Request message to DRL 308 indicating (Session-ID=888, Hop-by-Hop=300, End-to-End=1, "Message from Appl-1").

At step 2210, DRL 308 may receive a new transaction and search its ART using Origin-Appl-Name=Appl-1, but find no matches. DRL 308 may then search its PRT and find a rule for Route List-5 which resolves to Route-2 (Server1). DRL 308 may map (Appl-1, Hop=300) to (Server1, Hop=400).

At step 2212, DRL 308 may send a Request message to server1 1700 indicating (Session-ID=888, Hop-by-Hop=400, End-to-End=1, "Message from Appl-1").

At step 2214, server1 1700 may return an Answer message to DRL 308 indicating (Session-ID=888, Hop-by-Hop=400, End-to-End=1, Result-Code=DIAMETER_SUCCESS).

At step 2216, DRL 308 may correlate (Server1, Hop=400) to (Appl1, Hop=300). It is appreciated that this mapping was done in step 2210 above.

At step 2218, DRL 308 may send an Answer message to local application 1600 indicating (Session-ID=888, Hop-by-Hop=300, End-to-End=1, Result-Code=DIAMETER_SUCCESS).

At step 2220, local application-1 1600 may return an Answer message to DRL 308 indicating (Session-ID=222, Hop-by-Hop=200, End-to-End=999, Result-Code=DIAMETER_SUCCESS).

At step 2222, DRL 308 may correlate (Appl-1, Hop=200) to (Client1, Hop=100). It may be appreciated that this mapping was done in step 2202 above.

At step 2224, DRL 308 may send an Answer message to client1 1800 indicating (Session-ID=888, Hop-by-Hop=100, End-to-End=999, Result-Code=DIAMETER_SUCCESS).

Figure 23:
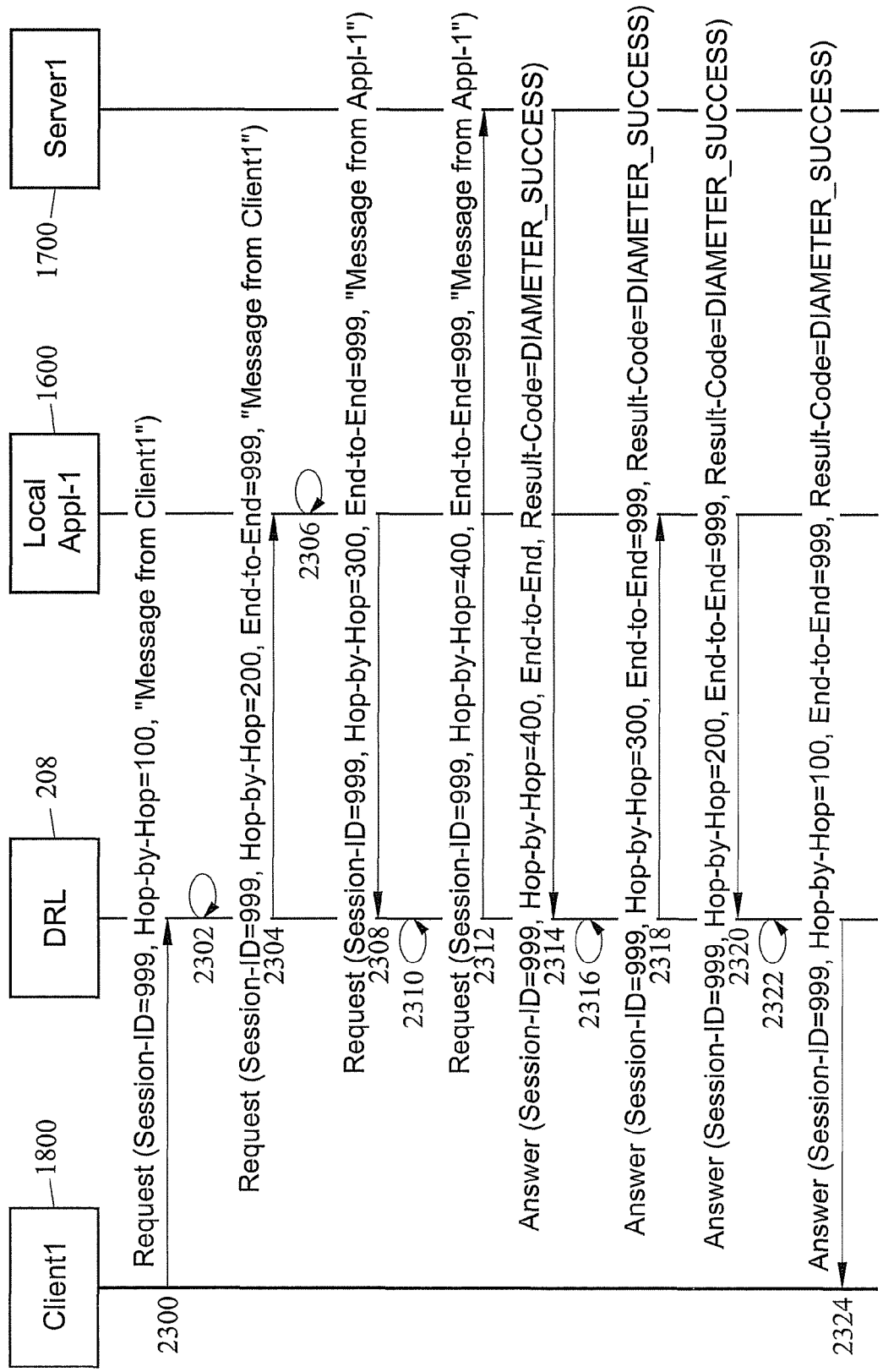
FIG. 23 is a message sequence diagram illustrating an exemplary local DSR application routing use case where the local proxy application stays in the signaling path without creating a new session according to an embodiment of the subject matter described herein.

FIG. 23 is a message sequence diagram illustrating an exemplary local DSR application routing use case where the local proxy application stays in the signaling path without creating a new session according to an embodiment of the subject matter described herein. In the use case shown in FIG. 23, Appl-1 1600 may be a Proxy Agent which does not create a new Session because it is merely tweaking the messages for end-to-end transactions.

At step 2300, client1 1800 may send a Request message to DRL 308 indicating (Session-ID=999, Hop-by-Hop=100, "Message form Client1").

At step 2302, DRL 308 may search its ART using Origin-Appl-ID="Network" and find a rule with Action="Route to Local DSR" and Destination-Appl-ID=1. DRL 308 may then create a new internal transaction "200" for Appl-1 and map (Client1, Hop=100) to (Appl-1, Hop=200).

At step 2304, DRL 308 may send a Request message to local application-1 1600 indicating (Session-ID=999, Hop-by-Hop=200, End-to-End=999, "Message from Client1").

At step 2306, Appl-1 1600 may want to stay in signaling path so Appl-1 1600 may apply any changes to the message and initiate a new transaction "300" to DRL 308 without creating a new Session.

At step 2308, local application-1 1600 may send a Request message to DRL 308 indicating (Session-ID=999, Hop-by-Hop=300, End-to-End=999, "Message from Appl-1").

At step 2310, DRL 308 may receive new transaction, search its ART using Origin-Appl-Name=Appl-1, and find no matches. DRL 308 may then search its PRT and find a match for Route List-5 which resolves to Route-2 (Server1). DRL 308 may map (Appl-1, Hop=300) to (Server1, Hop=400).

At step 2312, DRL 308 may send a Request message to server1 1700 indicating (Session-10=999, Hop-by-Hop=400, End-to-End=999, "Message from Appl-1").

At step 2314, server1 1700 may return an Answer message to DRL 308 indicating (Session-ID=999, Hop-by-Hop=400, End-to-End, Result-Code=DIAMETER_SUCCESS).

At step 2316, DRL 308 may correlate (Server1, Hop=400) to (Appl1, Hop=300). It may be appreciated that this mapping was done in step 2310 above.

At step 2318, DRL 308 may send an Answer message to local application-1 1600 indicating (Session-ID=999, Hop-by-Hop=300, End-to-End=999, Result-Code=DIAMETER_SUCCESS).

At step 2320, local application-1 1600 may return an Answer message to DRL 308 indicating (Session-ID=999, Hop-by-Hop=200, End-to-End=999, Result-Code=DIAMETER_SUCCESS).

At step 2322, DRL 308 may correlate (Appl-1, Hop=200) to (Client1, Hop=100). It may be appreciated that this mapping was done in step 2302 above.

At step 2324, DRL 308 may send an Answer message to client1 1800 indicating (Session-ID=999, Hop-by-Hop=100, End-to-End=999, Result-Code=DIAMETER_SUCCESS).

Figure 24:
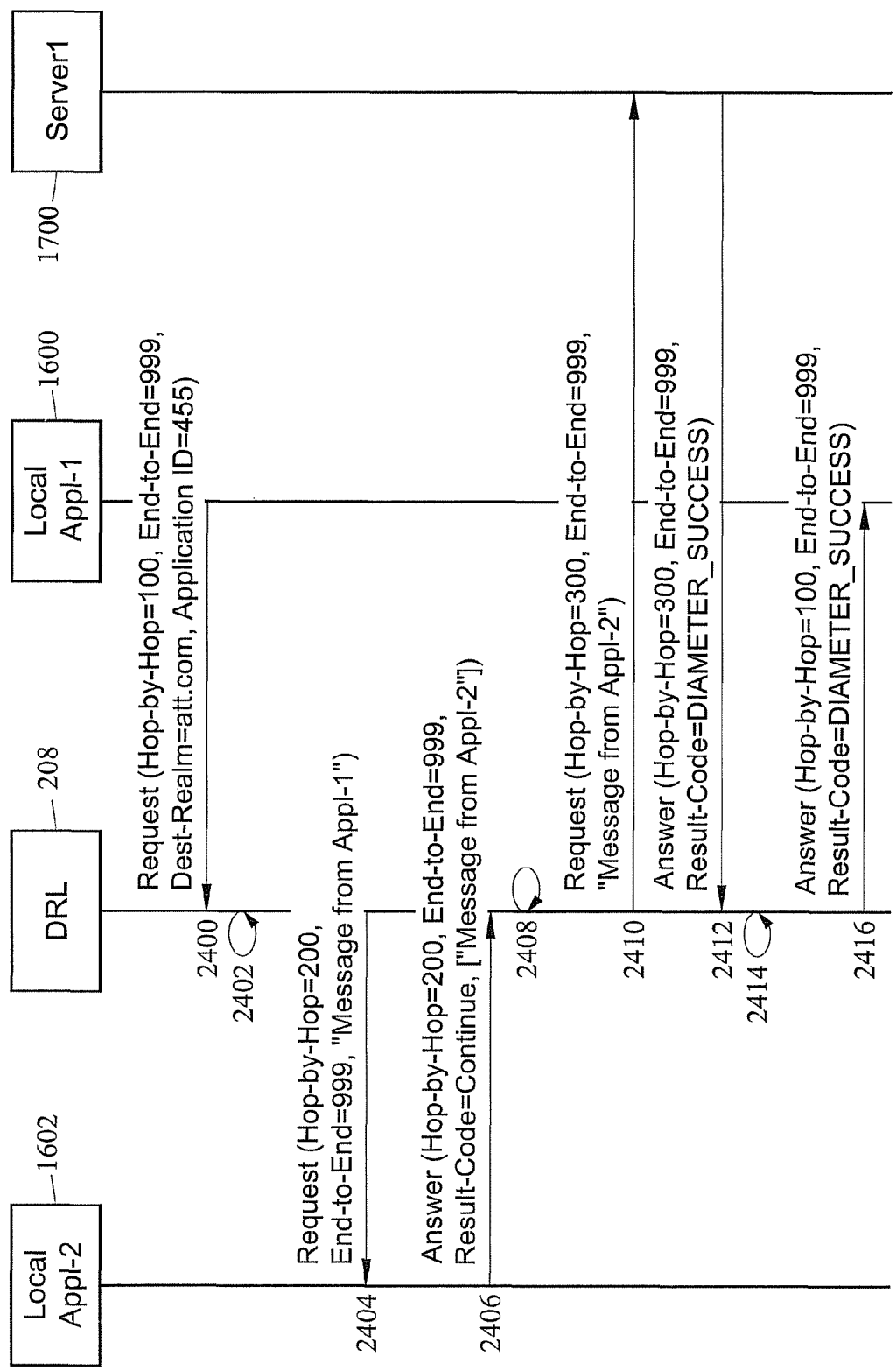
FIG. 24 is a message sequence diagram illustrating an exemplary local DSR application routing use case where the local client application initiates a transaction to a remote server and a local application intercepts and drops of the signaling path according to an embodiment of the subject matter described herein.

FIG. 24 is a message sequence diagram illustrating an exemplary local DSR application routing use case where the local client application initiates a transaction to a remote server and a local application intercepts and drops of the signaling path according to an embodiment of the subject matter described herein. Referring to FIG. 24, at step 2400, local application-1 1600 may send a Request message to DRL 308 indicating (Hop-by-Hop=100, End-to-End=999, Dest-Realm=att.com, Application ID=455).

At step 2402, DRL 308 may receive a new transaction and search its ART using Origin-Appl-Name=Appl-1 to find a rule with Action="Route to Local DSR" and Destination-Appl-ID=2. DRL 308 may then initiate a new transaction to Appl-2 and map (Appl-1, Hop=100) to (Appl-2, Hop=200).

At step 2404, DRL 308 may send a Request message to local application-2 1602 indicating (Hop-by-Hop=200, End-to-End=999, "Message from Appl-1").

At step 2406, local application-2 1602 may return an Answer message to DRL 308 indicating (Hop-by-Hop=200, End-to-End=999, Result-Code=Continue, ["Message from Appl-2"]).

At step 2408, the Answer response from Appl-1 1600 may have the application-specific Result-Code=Continue (i.e., Appl-1 is requesting that Request message processing should continue). Therefore, DRL 308 may remove (Appl-1, Hop=100) to (Appl-2, Hop=200) mapping (done in step 2402 above) and re-search its ART using Origin-Appl-Name=Appl-2 to find no additional matches. DRL 308 may then search its PRT and find RRR with Route List-5 which resolves to Route-2 (Server1). DRL 308 may then create (Client1, Hop=100) to (Server1, Hop=300) mapping.

At step 2410, DRL 308 may send a Request message to server1 1700 indicating (Hop-by-Hop=300, End-to-End=999, "Message from Appl-2").

At step 2412, server1 1700 may return an Answer message to DRL 308 indicating (Hop-by-Hop=300, End-to-End=999, Result-Code=DIAMETER_SUCCESS).

At step 2414, DRL 308 may correlate (Server1, Hop=300) to (Appl-1, Hop=100). It may be appreciated that this mapping was done in step 2408 above.

At step 2416, DRL 308 may send an Answer message to local application-1 1600 indicating (Hop-by-Hop=100, End-to-End=999, Result-Code=DIAMETER_SUCCESS).

Figure 25:
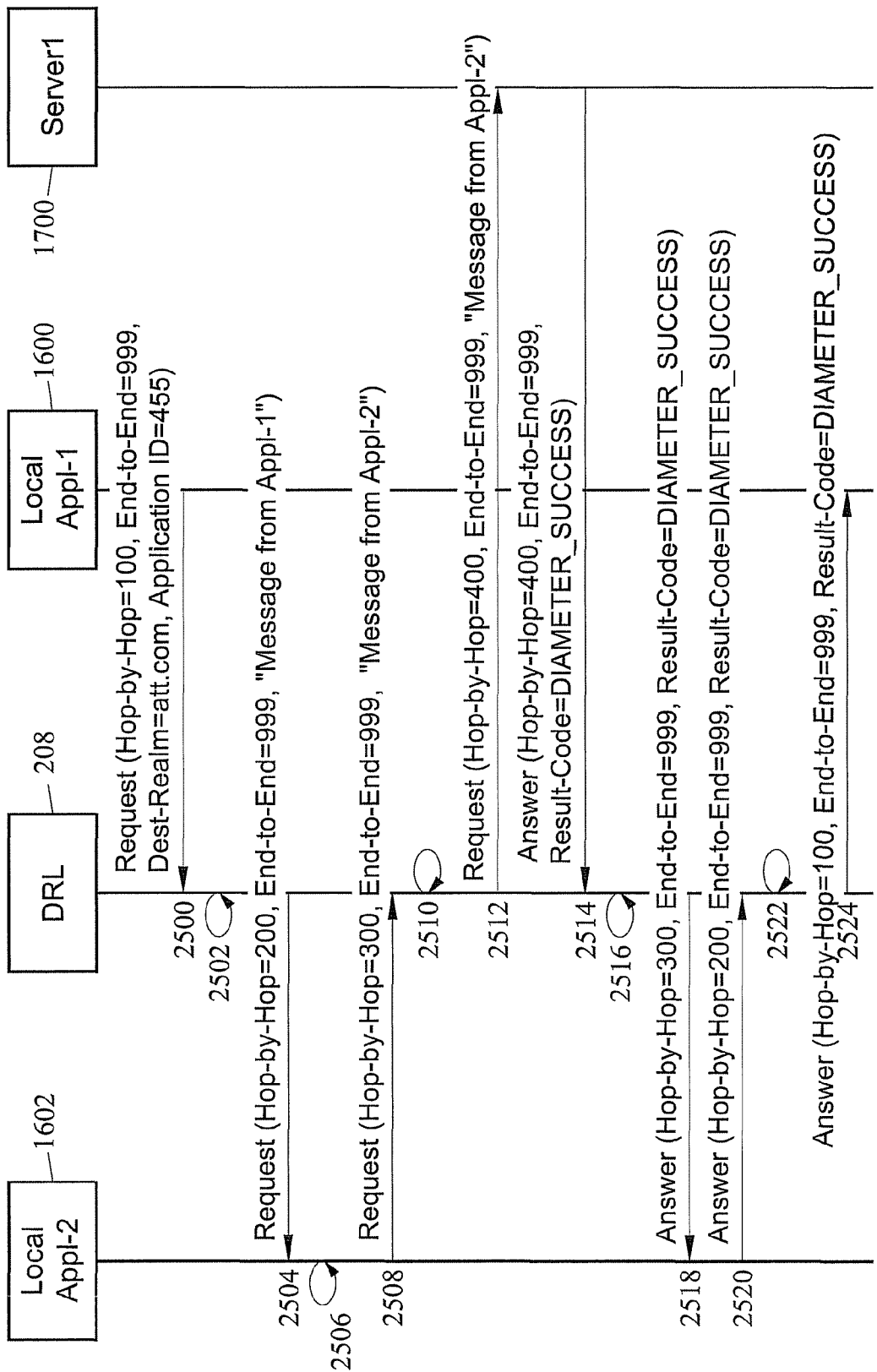
FIG. 25 is a message sequence diagram illustrating an exemplary local DSR application routing use case where the local client application initiates a transaction to a remote server and a local application intercepts and stays in the signaling path according to an embodiment of the subject matter described herein.

FIG. 25 is a message sequence diagram illustrating an exemplary local DSR application routing use case where the local client application initiates a transaction to a remote server and a local application intercepts and stays in the signaling path according to an embodiment of the subject matter described herein. Referring to FIG. 25, at step 2500, local application-1 1600 may send a Request message to DRL 308 indicating (Hop-by-Hop=100, End-to-End=999, Dest-Realm=att.com, Application ID=455).

At step 2502, DRL 308 may receive a new transaction, search its ART with Origin-Appl-Name=Appl-1 and find a rule with Action="Route to Local DSR" and Destination-Appl-ID=2. DRL 308 may then initiate a new transaction to Appl-2 and map (Appl-1, Hop=100) to (Appl-2, Hop=200).

At step 2504, DRL 308 may send a Request message to local application-2 1602 indicating (Hop-by-Hop=200, End-to-End=999, "Message from Appl-1").

At step 2506, Appl-2 1602 may want to stay in signaling path, therefore application-2 1602 may apply any changes to message and initiate new transaction "200" to DRL 308 (Appl-2 1602 maintains state information associated with the Diameter session).

At step 2508, local application-2 1602 may send a Request message to DRL 308 indicating (Hop-by-Hop=300, End-to-End=999, "Message from Appl-2").

At step 2510, DRL 308 may receive a new transaction, search its ART using Origin-Appl-Name=Appl-2 and find no matches. DRL 308 may then search its PRT and find a match for Route List-5 which resolves to Route-2 (Server1). DRL 308 may then map (Appl-2, Hop=300) to (Server1, Hop=400).

At step 2512, DRL 308 may send a Request message to server1 1700 indicating (Hop-by-Hop=400, End-to-End=999, "Message from Appl-2").

At step 2514, server1 1700 may return an Answer message to DRL 308 indicating (Hop-by-Hop=400, End-to-End=999, Result-Code=DIAMETER_SUCCESS).

At step 2516, DRL 308 may correlate (Server1, Hop=400) to (Appl-2, Hop=300). It may be appreciated that this mapping was done in step 2510 above.

At step 2518, DRL 308 may send an Answer message to local application-2 1602 indicating (Hop-by-Hop=300, End-to-End=999, Result-Code=DIAMETER_SUCCESS).

At step 2520, local application-2 1602 may return an Answer message to DRL 308 indicating (Hop-by-Hop=200, End-to-End=999, Result-Code=DIAMETER_SUCCESS).

At step 2522, DRL 308 may correlate (Appl-2, Hop=200) to (Appl-1, Hop=100). It may be appreciated that this mapping was done in step 2502 above.

At step 2524, DRL 308 may send an Answer message to local application-1 1600 indicating (Hop-by-Hop=100, End-to-End=999, Result-Code=DIAMETER_SUCCESS).

Figure 26:
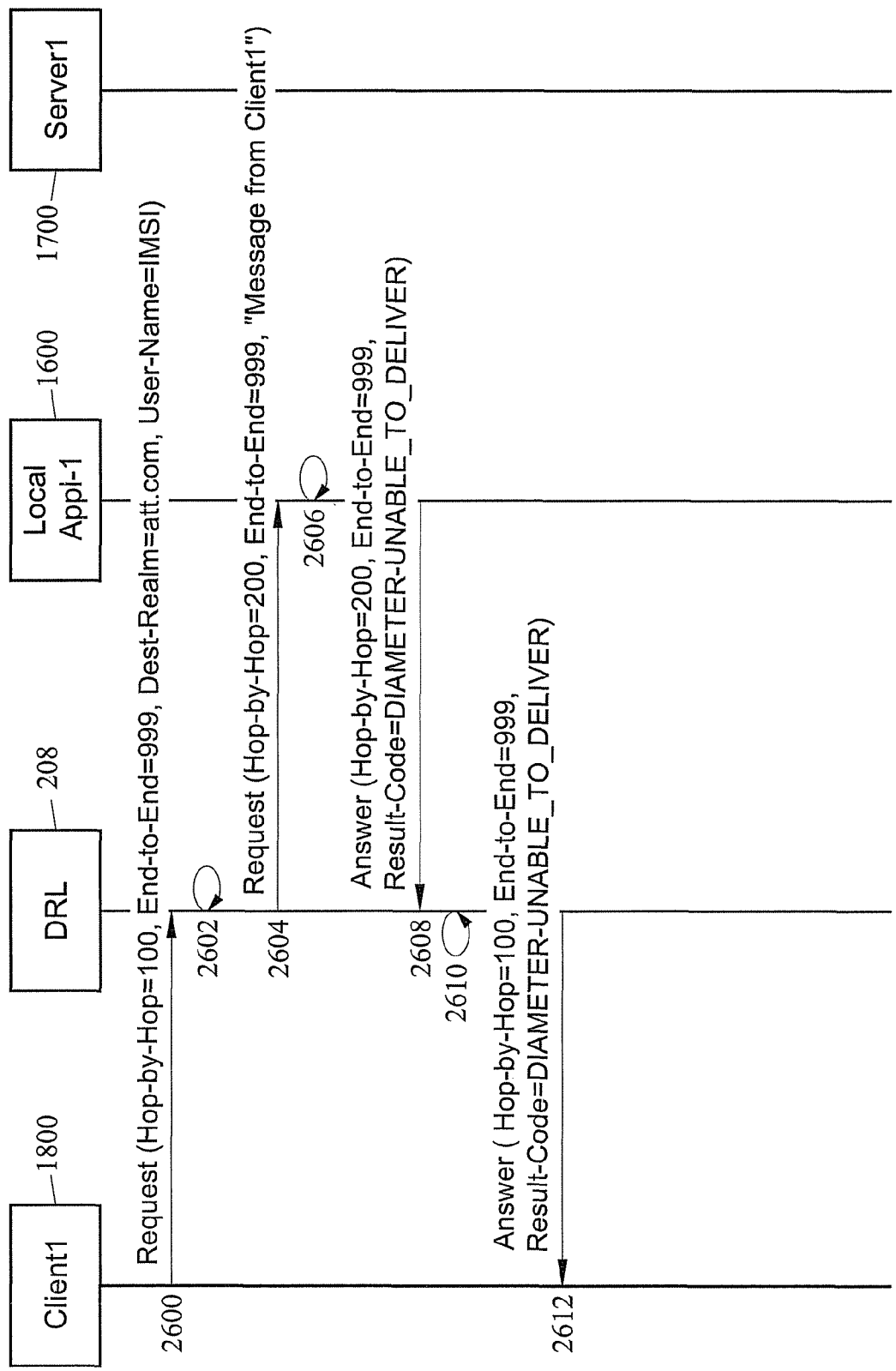
FIG. 26 is a message sequence diagram illustrating an exemplary local DSR application routing use case where the local proxy application aborts the transaction according to an embodiment of the subject matter described herein.

FIG. 26 is a message sequence diagram illustrating an exemplary local DSR application routing use case where the local proxy application aborts the transaction according to an embodiment of the subject matter described herein. Referring to FIG. 24, at step 2600, client1 1800 may send a Request message to DRL 308 indicating (Hop-by-Hop=100, End-to-End=999, Dest-Realm=att.com, User-Name=IMSI).

At step 2602, DRL 308 may search its ART using Origin-Appl-ID="Network" and find rule with Action="Route to Local DSR" and Destination-Appl-ID=1. DRL 308 may then create a new internal transaction "200" for Appl-1 and map (Client1, Hop=100) to (Appl-1, Hop=200).

At step 2604, DRL 308 may send a Request message to local application-1 1600 indicating (Hop-by-Hop=200, End-to-End=999, "Message from Client1").

At step 2606, Appl-1 1600 may encounter unrecoverable error and abort the transaction.

At step 2608, local application-1 1600 may return an Answer message to DRL 308 indicating (Hop-by-Hop=200, End-to-End=999, Result-Code=Diameter_UNABLE_TO_DELIVER).

At step 2610, DRL 308 may correlate (Appl-1, Hop=200) to (Client1, Hop=100). It may be appreciated that this mapping was done in step 2602 above.

At step 2612, DRL 308 may send an Answer message to client1 1800 indicating (Hop-by-Hop=100, End-to-End=999, Result-Code=Diameter_UNABLE_TO_DELIVER).

Figure 27:
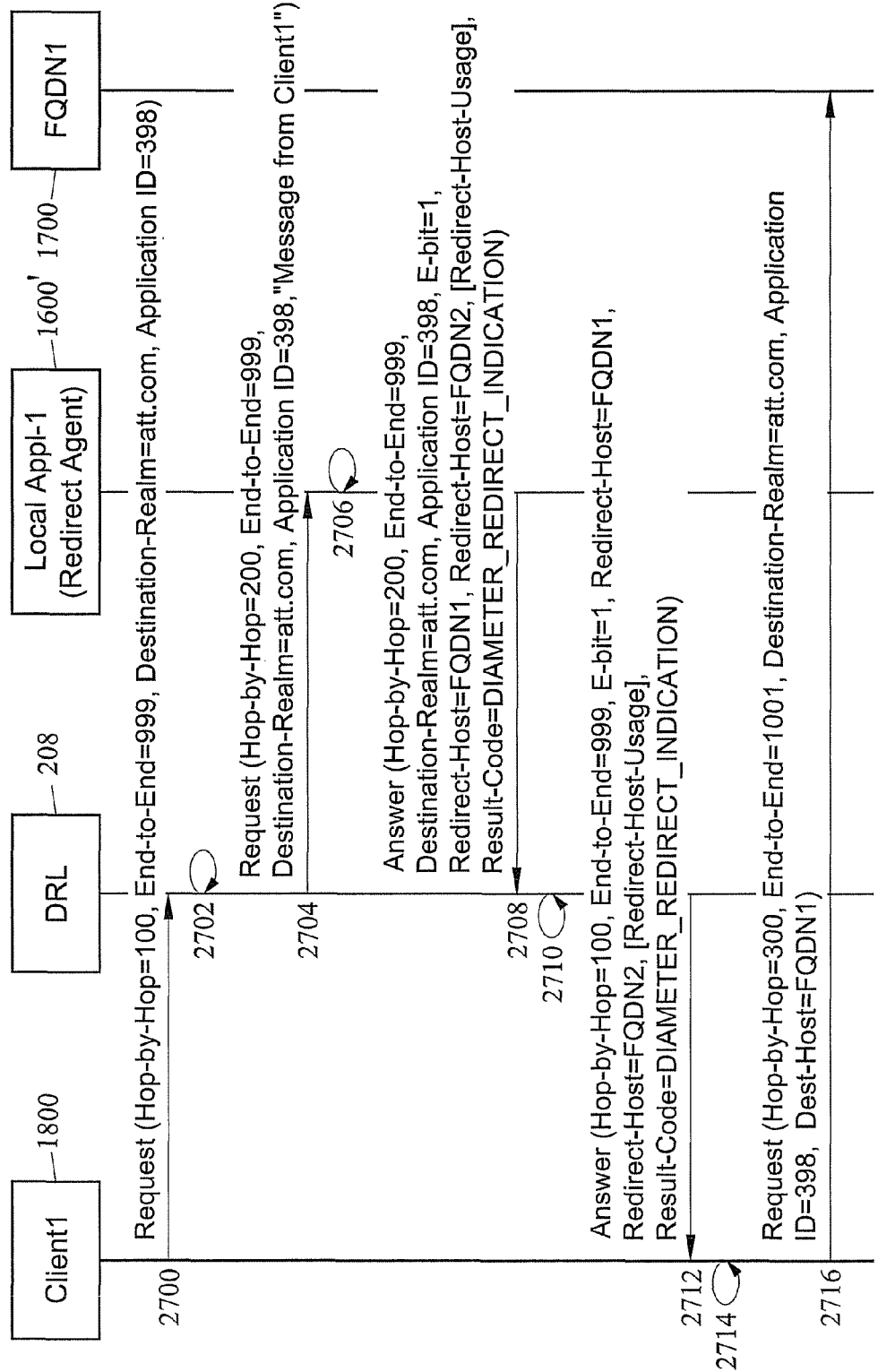
FIG. 27 is a message sequence diagram illustrating an exemplary local DSR application routing use case where the DSR serves as a redirect agent for a local application according to an embodiment of the subject matter described herein.

FIG. 27 is a message sequence diagram illustrating an exemplary local DSR application routing use case where the DSR serves as a redirect agent for a local application according to an embodiment of the subject matter described herein. Referring to FIG. 27, at step 2700, client1 1800 may send a Request message to DRL 308 indicating (Hop-by-Hop=100, End-to-End=999, Destination-Realm=att.com, Application ID=398).

At step 2702, DRL 308 may search its ART using Origin-Appl-ID="Network" and find rule with Action="Route to Local DSR" and Destination-Appl-ID=1. DRL 308 may then create a new internal transaction "200" for Appl-1 and map (Client1, Hop=100) to (Appl-1, Hop=200).

At step 2704, DRL 308 may send a Request message to FQDN1 1700 indicating (Hop-by-Hop=200, End-to-End=999, Destination-Realm=att.com, Application 10=398, "Message from Client1").

At step 2706, local application-1 DSR Redirect Agent application 1600' may look at information in the Request message and create a list of one or more Destinations (Redirect-Host) for routing the message.

At step 2708, local application-1 DSR Redirect Agent application 1600' may return an Answer message to DRL 308 (Hop-by-Hop=200, End-to-End=999, Destination-Realm=att.com, Application 10=398, E-bit=1, Redirect-Host=FQDN1, Redirect-Host=FQDN2, [Redirect-Host-Usage], Result-Code=Diameter_REDIRECT_INDICATION).

At step 2710, DRL 308 may correlate (Appl-1, Hop=200) to (Client1, Hop=100). It may be appreciated that this mapping was done in step 2702 above.

At step 2712, DRL 308 may send an Answer message to client1 1800 indicating (Hop-by-Hop=100, End-to-End=999, E-bit=1, Redirect-Host=FQDN1, Redirect-Host=FQDN2, [Redirect-Host-Usage], Result-Code=Diameter_REDIRECT_INDICATION).

At step 2714, upon receipt of the Answer response with Result-Code=Diameter_REDIRECT_INDICATION, Diameter client1 1800 may attempt to route the message to the host identified in the first Redirect-Host AVP.

At step 2716, client1 1800 may send a Request message to FQDN1 1700 indicating (Hop-by-Hop=300, End-to-End=1001, Destination-Realm=att.com, Application 10=398, Dest-Host=FQDN1).

Figure 28:
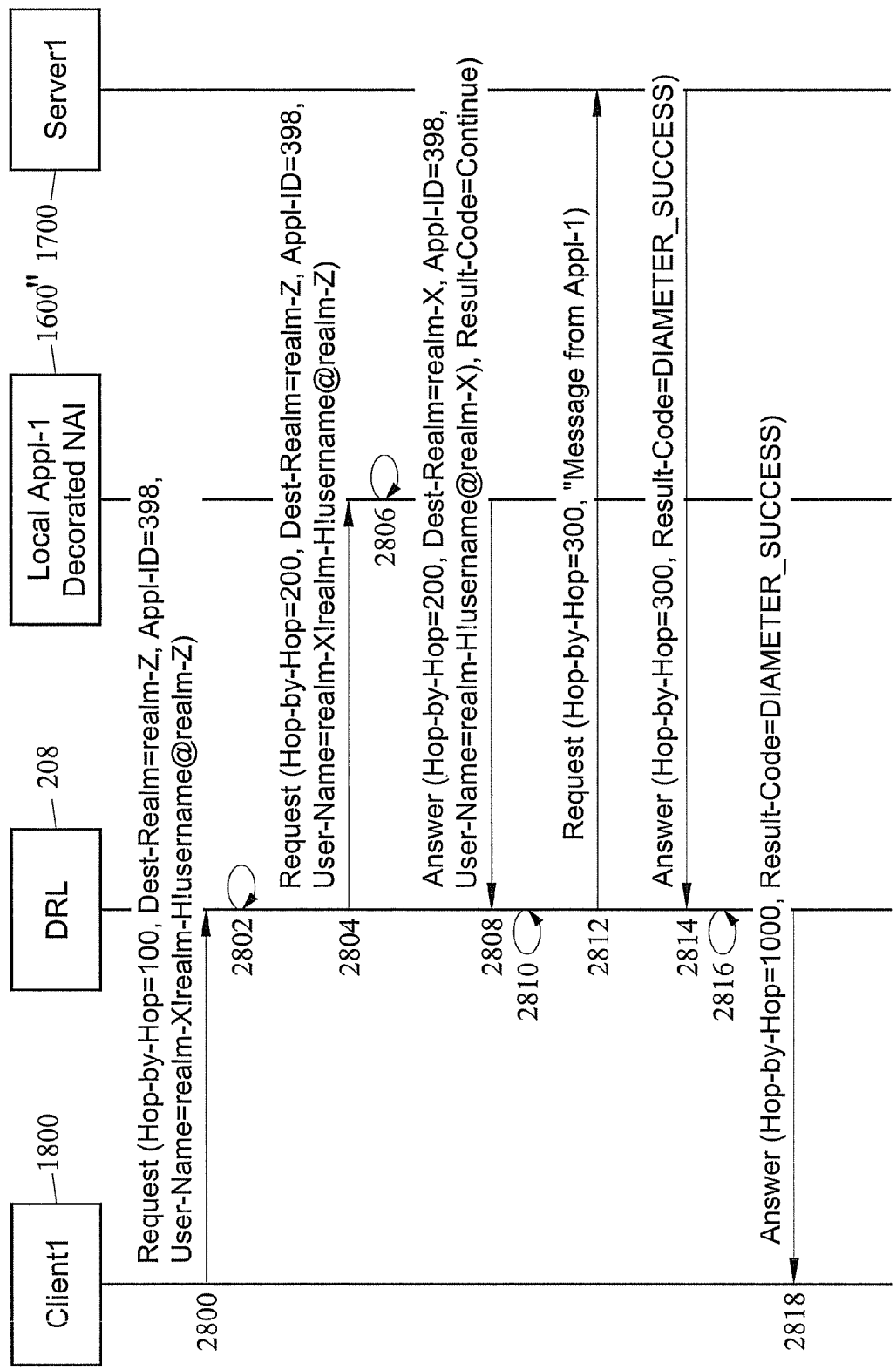
FIG. 28 is a message sequence diagram illustrating an exemplary local DSR application routing use case where the local DSR application performs decorated NAI processing according to an embodiment of the subject matter described herein.

FIG. 28 is a message sequence diagram illustrating an exemplary local DSR application routing use case where the local DSR application performs decorated NAI processing according to an embodiment of the subject matter described herein. Referring to FIG. 28, at step 2800, client1 1800 may send a Request message to DRL 308 indicating (Hop-by-Hop=100, Dest-Realm=realm-Z, Appl-ID=398, User-Name=realm-X!realm-H!username@realm-Z).

At step 2802, DRL 308 may search its ART using Origin-Appl-ID="Network" and find rule with Action="Route to Local DSR" and Destination-Appl-ID=1. DRL 308 may then create a new internal transaction "200" for Appl-1 and map (Client1, Hop=100) to (Appl-1, Hop=200).

At step 2804, DRL 308 may send a Request message to local application-1 decorated NAI 1600" indicating (Hop-by-Hop=200, Dest-Realm=realm-Z, Appl-ID=398, User-Name=realm-X!realm-H!username@realm-Z).

At step 2806, local DSR application-1 1600" may perform Decorated NAI processing, return the message back to DRL for outbound routing, and drop out of the signaling path.

At step 2808, application-1 decorated NAI 1600" may return an Answer message to DRL 308 indicating (Hop-by-Hop=200, Dest-Realm=realm-X, Appl-ID=398, User-Name=realm-Rusername@realm-X), Result-Code=Continue).

At step 2810, Answer response from Appl-1 has application-specific Result-Code=Continue (i.e., Appl-1 is requesting that Request message processing should continue). Therefore, DRL 308 may remove (Client1, Hop=100) to (Appl-1, Hop=200) mapping (performed in step 2802 above) and re-search its ART with Origin-Appl-Name=Appl-1. Finding no additional matches, DRL 308 may then search its PRT and find RRR with Route List-5 which resolves to Route-2 (Server1). DRL 308 may then create a (Client1, Hop=100) to (Server1, Hop=300) mapping.

At step 2812, DRL 308 may send a Request message to server1 1700 indicating (Hop-by-Hop=300, "Message from Appl-1").

At step 2814, server1 1700 may return an Answer message to DRL 308 indicating (Hop-by-Hop=300, Result-Code=DIAMETER_SUCCESS).

At step 2816, DRL 308 may correlate (Server1, Hop=300) to (Client1, Hop=100). It is appreciated that this mapping was done in step 2810 above.

At step 2818, DRL 308 may send an Answer message to client1 1800 indicating (Hop-by-Hop=1000, Result-Code=DIAMETER_SUCCESS).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for routing Diameter messages between multiple Diameter message processors that comprise a Diameter signaling router (DSR), the method comprising:

receiving, at an ingress Diameter message processor associated with the DSR, a Diameter message from a peer Diameter element;

at the ingress Diameter message processor, using application routing data to determine whether processing of the Diameter message by a Diameter application is required, wherein using application routing data to determine whether processing of the Diameter message by a Diameter application is required includes determining whether one or more application routing data rules should be applied based on information in one or more Diameter attribute value pairs in the Diameter message;

in response to determining that Diameter application processing is required, forwarding the Diameter message to a Diameter message processor hosting the Diameter application identified by the application routing data for processing, wherein the Diameter application is within the DSR; and in response to determining that Diameter application processing is not required, forwarding the Diameter message to an egress Diameter message processor associated with the DSR.

2. The method of claim 1 comprising returning the Diameter message that is forwarded to the Diameter application to the ingress Diameter message processor following processing by the Diameter application.

3. The method of claim 1 wherein the Diameter application is a local application that is hosted by the DSR.

4. The method of claim 3 wherein the Diameter application maintains state information for a Diameter session with which the Diameter message is associated.

5. The method of claim 1 wherein the Diameter application is a remote application that is hosted by a Diameter element other than the DSR.

6. The method of claim 1 wherein forwarding the Diameter message to an egress Diameter message processor associated with the logical DSR element, includes accessing a Diameter peer-routing module on the ingress Diameter message processor in order to determine to which egress Diameter message processor the Diameter message is to be forwarded.

7. The method of claim 5 wherein the Diameter peer-routing modules associated with the ingress and egress Diameter message processors share common Diameter peer-routing information.

8. The method of claim 1 wherein forwarding the Diameter message to a Diameter application identified by the application routing data for processing includes selecting one of many Diameter applications based on the availability status of the many Diameter applications.

9. The method of claim 1 wherein forwarding the Diameter message to a Diameter application identified by the application routing data for processing includes selecting one of many Diameter applications based on the congestion status of the many Diameter applications.

10. The method of claim 1 wherein forwarding the Diameter message to a Diameter application identified by the application routing data for processing includes selecting one of many Diameter applications based on the message processing capacity of the many Diameter applications.

11. A Diameter signaling router (DSR) comprising:
an egress Diameter message processor associated with the DSR; and
an ingress Diameter message processor associated with the DSR and configured to:
receive a Diameter message from a peer Diameter element;
determine whether processing of the Diameter message by a Diameter application is required, wherein determining whether processing of the Diameter message by the Diameter application is required includes accessing application routing data, wherein using application routing data to determine whether processing of the Diameter message by a Diameter application is required includes determining whether one or more application routing data rules should be applied based on information in one or more Diameter attribute value pairs in the Diameter message;
forward the Diameter message to a Diameter message processor hosting the Diameter application identified by the application routing data for processing in response to determining that Diameter application processing is required, wherein the Diameter application is within the DSR; and
forward the Diameter message to the egress Diameter message processor in response to determining that Diameter application processing is not required.

12. The DSR of claim 11 comprising returning the Diameter message that is forwarded to the Diameter application to the ingress Diameter message processor following processing by the Diameter application.

13. The DSR of claim 11 wherein the DSR element hosts a local Diameter application.

14. The DSR of claim 13 wherein the Diameter application maintains state information for a Diameter session with which the Diameter message is associated.

15. The DSR of claim 11 wherein the Diameter application is a remote application that is hosted by a Diameter element other than the DSR element.

16. The logical DSR element of claim 11 wherein the egress Diameter message processor is configured to access a Diameter peer-routing module on the ingress Diameter message processor in order to determine to which egress Diameter message processor the Diameter message is to be forwarded.

17. The DSR of claim 15 wherein the ingress and egress Diameter message processors share common Diameter peer-routing information.

18. The DSR of claim 11 wherein the ingress Diameter message processor is configured to select one of many Diameter applications based on the availability status of the many Diameter applications.

19. The DSR of claim 11 wherein the ingress Diameter message processor is configured to select one of many Diameter applications based on the congestion status of the many Diameter applications.

20. The DSR of claim 11 wherein the ingress Diameter message processor is configured to select one of many Diameter applications based on the message processing capacity of the many Diameter applications.

21. A non-transitory computer readable medium comprising computer executable instructions embodied in a computer readable medium and when executed by a processor of a computer performs steps comprising:
receiving, at an ingress Diameter message processor associated with a Diameter signaling router (DSR), a Diameter message from a peer Diameter element;
at the ingress Diameter message processor, using application routing data to determine whether processing of the Diameter message by a Diameter application is required, wherein using application routing data to determine whether processing of the Diameter message by a Diameter application is required includes determining whether one or more application routing data rules should be applied based on information in one or more Diameter attribute value pairs in the Diameter message;
in response to determining that Diameter application processing is required, forwarding the Diameter message to a Diameter message processor hosting a Diameter application identified by the application routing data for processing, wherein the Diameter application is within the DSR; and
in response to determining that Diameter application processing is not required, forwarding the Diameter message to an egress Diameter message processor associated with the DSR.

* * * * *